(12) United States Patent
Nishimura

(10) Patent No.: US 9,947,910 B2
(45) Date of Patent: Apr. 17, 2018

(54) ENERGY STORAGE APPARATUS AND SPACER

(71) Applicant: GS Yuasa International Ltd., Kyoto-shi (JP)

(72) Inventor: Yosuke Nishimura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 118 days.

(21) Appl. No.: 15/191,352

(22) Filed: Jun. 23, 2016

(65) Prior Publication Data

US 2017/0012267 A1   Jan. 12, 2017

(30) Foreign Application Priority Data

Jul. 7, 2015  (JP) .................................. 2015-136251

(51) Int. Cl.
*H01M 2/18* (2006.01)
*H01M 10/613* (2014.01)
(Continued)

(52) U.S. Cl.
CPC ........... *H01M 2/18* (2013.01); *H01M 2/1016* (2013.01); *H01M 2/1653* (2013.01);
(Continued)

(58) Field of Classification Search
CPC .... H01M 2/18; H01M 2/1016; H01M 2/1653; H01M 10/613; H01M 10/647; H01M 10/6557; H01M 10/6561
See application file for complete search history.

(56) References Cited

U.S. PATENT DOCUMENTS

2007/0037051 A1* 2/2007 Kim ..................... H01M 2/1016
429/151
2009/0111010 A1* 4/2009 Okada ................. H01M 10/613
429/120
(Continued)

FOREIGN PATENT DOCUMENTS

JP   2008-004289 A    1/2008
JP   2009-277471 A   11/2009
(Continued)

*Primary Examiner* — Gregg Cantelmo
(74) *Attorney, Agent, or Firm* — McGinn IP Law Group, PLLC

(57) ABSTRACT

Provided is an energy storage apparatus where a spacer includes: a base disposed orthogonal to a first direction; a first restricting portion and a second restricting portion extending from an end portion of the base in a second direction orthogonal to the first direction; a first projecting portion projecting from the base and the first restricting portion; and a second projecting portion projecting from the base and the second restricting portion. The first projecting portion includes: a first portion extending in the second direction on one surface of the base; and a second portion extending to a distal end in the first restricting portion, and is continuously formed at least from an end portion of the first portion on a first-restricting-portion side to a distal end of the second portion. The second projecting portion includes: a third portion which extends in the second direction on the other surface of the base and disposed at the position different from the first portion in a third direction; and a fourth portion extending to a distal end on the second restricting portion, and is continuously formed at least from an end portion of the third portion on a second-restricting-portion side to a distal end of the fourth portion. The distal end of the second portion and the distal end of the fourth portion are disposed at the same position in the third direction.

12 Claims, 17 Drawing Sheets

(51) Int. Cl.
  *H01M 10/647* (2014.01)
  *H01M 10/6557* (2014.01)
  *H01M 10/6561* (2014.01)
  *H01M 2/10* (2006.01)
  *H01M 2/16* (2006.01)

(52) U.S. Cl.
  CPC ....... *H01M 10/613* (2015.04); *H01M 10/647* (2015.04); *H01M 10/6557* (2015.04); *H01M 10/6561* (2015.04)

(56) References Cited

U.S. PATENT DOCUMENTS

| | | | |
|---|---|---|---|
| 2012/0052359 A1* | 3/2012 | Yoshitake | H01M 2/1077 429/120 |
| 2014/0302378 A1 | 10/2014 | Tsuruta et al. | |
| 2016/0036101 A1* | 2/2016 | Nishimura | H01M 10/617 429/120 |
| 2016/0036105 A1* | 2/2016 | Toshioka | H01M 2/1077 429/120 |
| 2016/0329532 A1* | 11/2016 | Nishimura | H01M 2/02 |

FOREIGN PATENT DOCUMENTS

| | | |
|---|---|---|
| JP | 2013-004341 A | 1/2013 |
| JP | 2014-035969 A | 2/2014 |
| JP | 2014-035971 A | 2/2014 |
| JP | 2014-220234 A | 11/2014 |
| WO | WO 2012/057169 A1 | 5/2012 |

\* cited by examiner

FIG. 10
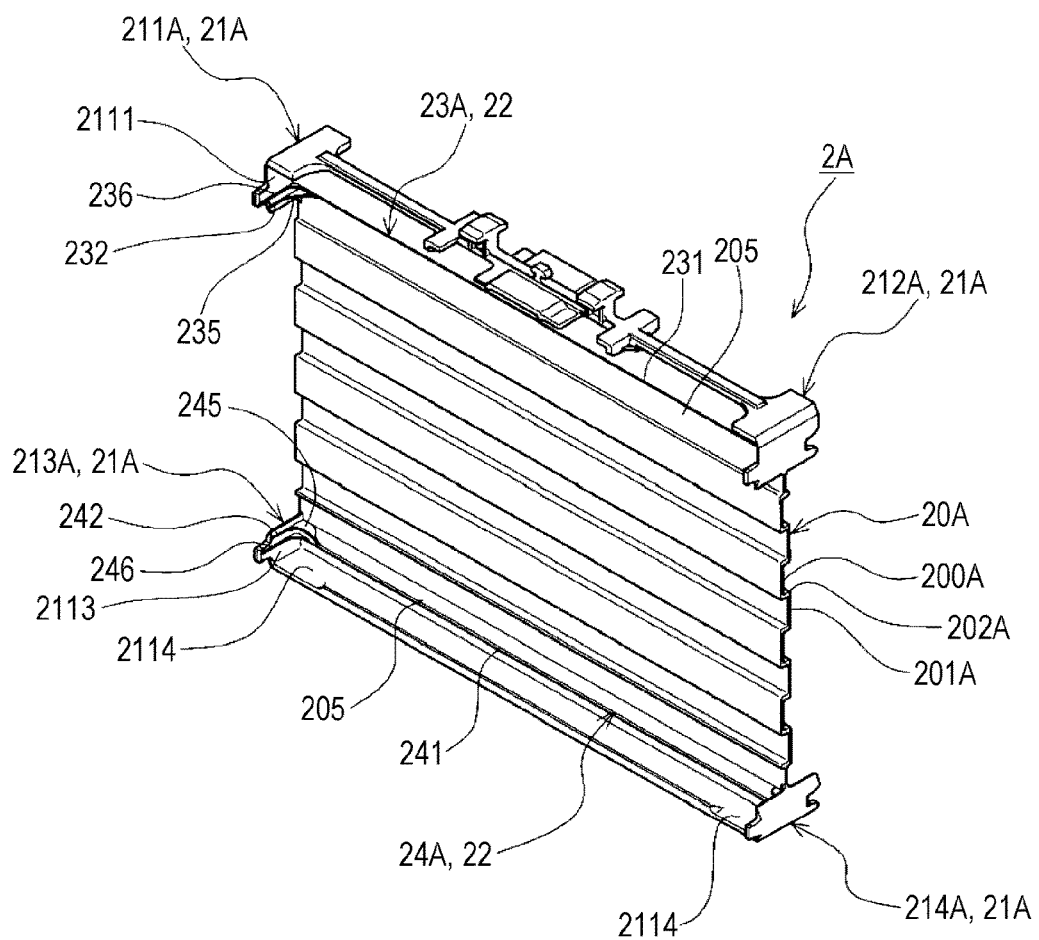
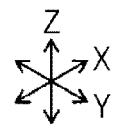

ENERGY STORAGE APPARATUS AND SPACER

CROSS-REFERENCE TO RELATED APPLICATIONS

This application claims the benefit of Japanese patent application No. 2015-136251 filed on Jul. 7, 2015, which is incorporated by reference.

FIELD

The present invention relates to an energy storage apparatus which includes spacers arranged in a row in a predetermined direction, and energy storage devices each of which is disposed between the spacers disposed adjacently to each other, and a spacer used in an energy storage apparatus.

BACKGROUND

Conventionally, there has been known an energy storage apparatus which includes a plurality of battery cells, and a plurality of energy storage cell holders each of which is disposed between the battery cells disposed adjacently to each other (see JP-A-2014-35969).

To be more specific, as shown in FIG. 21 and FIG. 22, the energy storage apparatus includes a plurality of battery cells 501 arranged in a row in a predetermined direction (stacking direction), and a plurality of energy storage cell holders 502 each of which is disposed between the battery cells 501 disposed adjacently to each other. The energy storage cell holder 502 includes a corrugated plate portion 503 which is disposed between the battery cells 501 and expands in a direction orthogonal to the stacking direction, and engaging portions 504 which project from four corners of the plate portion 503 in the stacking direction. The energy storage cell holders 502 disposed adjacent to each other are positioned relative to each other as the engaging portions 504 of these energy storage cell holders 502 mutually engage with each other. The battery cell 501 is positioned relative to the energy storage cell holder 502 by making the engaging portions 504 engage with four corners of the battery cell 501. In such a configuration, between the corrugated plate portion 503 and the battery cell 501 disposed adjacently to the plate portion 503, a plurality of cooling medium passages 505 extending in a width direction of the battery cell 501 are formed. A sealing projection 506 extending in a width direction is formed on an upper edge and a lower edge of the plate portion 503 of the energy storage cell holder 502 respectively. By bringing the sealing projections 506 into pressure contact with an insulation seat formed on a surface of the battery cell 501 such that the sealing projections 506 bite into the insulation seat, sealing is applied such that a cooling medium made of cold air does not leak from an upper portion and a lower portion of the cooling medium passage 505.

As shown in FIG. 22, in the energy storage apparatus 500, in the pair of energy storage cell holders 502 disposed adjacently to each other with the battery cell 501 interposed therebetween, a height position of the sealing projection 506 formed on a surface of the plate portion 503 of one energy storage cell holder 502 which is directed to the battery cell 501 (a surface of the energy storage cell holder 502 disposed on a left side which is directed to a right side in FIG. 22) and a height position of the sealing projection 506 formed on a surface of the plate portion 503 (a surface of the energy storage cell holder 502 disposed on a right side which is directed to a left side in FIG. 22) differ from each other. In each energy storage cell holder 502, in a portion of each engaging portion 504 which faces the battery cell 501, the sealing projection 506 extends in a straight line in the stacking direction from the plate portion 503 to a distal end of the engaging portion 504. Accordingly, a height position of the sealing projection 506 formed on the engaging portion 504 extending toward one side in a stacking direction (a right side of the energy storage cell holder 502 disposed on a left side of the battery cell 501 disposed at the center in FIG. 22), and a height position of the sealing projection 506 formed on the engaging portion 504 extending toward the other side (a left side of the energy storage cell holder 502 disposed on a right side of the battery cell 501 disposed at the center in FIG. 22) differ from each other. In such a configuration, with respect to the engaging portions 504 which correspond to each other of the energy storage cell holders 502 disposed on both sides of the battery cell 501 in the stacking direction, although distal ends of the engaging portions 504 are made to opposedly face each other, the height positions of the sealing projections 506 are made different from each other between the pair of engaging portions 504 whose distal ends are made to opposedly face each other. Accordingly, in the above-mentioned pair of engaging portions 504, a gap between a distal end of the sealing projection 506 formed on the engaging portion 504 extending toward one side and a distal end of the sealing projection 506 formed on the engaging portion 504 extending toward the other side becomes large (to be more specific, becomes larger than a gap between the distal ends of the engaging portions 504). As a result, a cooling fluid leaks from the above-mentioned gap (formed between the battery cell 501 and the engaging portions 504 extending in the stacking direction at four corners of the battery cell 501). In this case, cooling efficiency or the like of the battery cell 501 is lowered.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Accordingly, an object of the present invention is to provide an energy storage apparatus where a fluid which flows between an energy storage device and a spacer minimally leaks to the outside from between the energy storage device and a restricting portion of the spacer, and a spacer used in the energy storage apparatus.

An energy storage apparatus according to an aspect of the present invention includes: a first spacer and a second spacer arranged in a row in a first direction; and an energy storage device disposed between the first spacer and the second spacer, the first spacer includes: a first base which has a first surface expanding in a direction orthogonal to the first direction and facing the energy storage device, and forms a flow channel through which a fluid is allowed to flow between the first base and the energy storage device; a first restricting portion which extends in the first direction from the first base along an end portion of the energy storage device in a second direction orthogonal to the first direction;

and a first projecting portion which projects toward the energy storage device from the first surface of the first base and the first restricting portion, and is brought into contact with the energy storage device, the first projecting portion includes: a first portion extending in the second direction on the first surface of the first base; and a second portion extending to a distal end of the first restricting portion from a first base side on the first restricting portion, the first projecting portion being continuously formed at least from an end portion of the first portion on a first restricting portion side to a distal end of the second portion, the second spacer includes: a second base which has a second surface expanding in a direction orthogonal to the first direction and facing the energy storage device, and forms a flow channel through which a fluid is allowed to flow between the second base and the energy storage device; a second restricting portion which extends in the first direction from the second base along the end portion of the energy storage device in the second direction; and a second projecting portion which projects toward the energy storage device from the second surface of the second base and the second restricting portion, and is brought into contact with the energy storage device, the second projecting portion includes: a third portion extending in the second direction on the second surface of the second base and disposed at a position different from the first portion of the first projecting portion in a third direction orthogonal to the first direction and the second direction; and a fourth portion extending to a distal end of the second restricting portion from a second base side of the second restricting portion, the second projecting portion being continuously formed at least from an end portion of the third portion on a second restricting portion side to a distal end of the fourth portion, the distal end of the first restricting portion of the first spacer and the distal end of the second restricting portion of the second spacer opposedly face each other in the first direction, and the distal end of the second portion of the first spacer and the distal end of the fourth portion of the second spacer opposedly face each other.

BRIEF DESCRIPTION OF DRAWINGS

The foregoing and other features of the present invention will become apparent from the following description and drawings of an illustrative embodiment of the invention in which:

FIG. 10 is a perspective view of the inner spacer as viewed from the first surface side.

DESCRIPTION OF EMBODIMENTS

Figure 1:
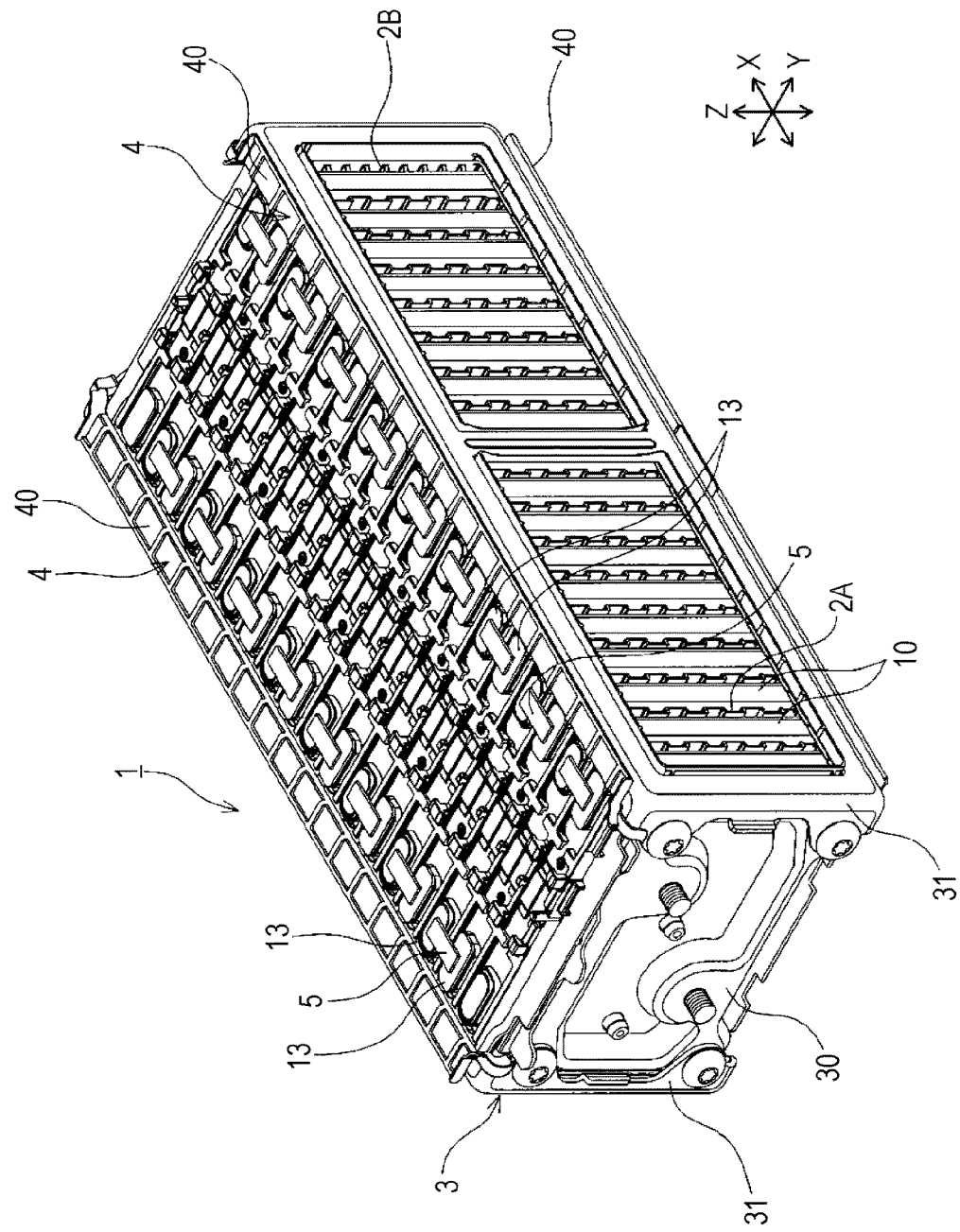
FIG. 1 is a perspective view of an energy storage apparatus according to this embodiment.

According to an aspect of the present invention, there is provided an energy storage apparatus including: a first spacer and a second spacer arranged in a row in a first direction; and an energy storage device disposed between the first spacer and the second spacer, the first spacer includes: a first base which has a first surface expanding in a direction orthogonal to the first direction and facing the energy storage device, and forms a flow channel through which a fluid is allowed to flow between the first base and the energy storage device; a first restricting portion which extends in the first direction from the first base along an end portion of the energy storage device in a second direction orthogonal to the first direction; and a first projecting portion which projects toward the energy storage device from the first surface of the first base and the first restricting portion, and is brought into contact with the energy storage device, the first projecting portion includes: a first portion extending in the second direction on the first surface of the first base; and a second portion extending to a distal end of the first restricting portion from a first base side on the first restricting portion, the first projecting portion being continuously formed at least from an end portion of the first portion on a first restricting portion side to a distal end of the second portion, the second spacer includes: a second base which has a second surface expanding in a direction orthogonal to the first direction and facing the energy storage device, and forms a flow channel through which a fluid is allowed to flow between the second base and the energy storage device; a second restricting portion which extends in the first direction from the second base along the end portion of the energy storage device in the second direction; and a second projecting portion which projects toward the energy storage device from the second surface of the second base and the second restricting portion, and is brought into contact with the energy storage device, the second projecting portion includes: a third portion extending in the second direction on the second surface of the second base and disposed at a position different from the first portion of the first projecting portion in a third direction orthogonal to the first direction and the second direction; and a fourth portion extending to a distal end of the second restricting portion from a second base side of the second restricting portion, the second projecting portion being continuously formed at least from an end portion of the third portion on a second restricting portion side to a distal end of the fourth portion, the distal end of the first restricting portion of the first spacer and the distal end of the second restricting portion of the second spacer opposedly face each other in the first direction, and the distal end of the second portion of the first spacer and the distal end of the fourth portion of the second spacer opposedly face each other.

With such a configuration, even when a position in the third direction of the projecting portion (first portion) disposed on the first surface of the first spacer and a position in the third direction of the projecting portion (third portion) disposed on the second surface of the second spacer differ from each other, the projecting portions (the first projecting portions and the second projecting portions) respectively extend to distal ends of the pair of restricting portions (the first restricting portion and the second restricting portion) which opposedly face each other at the end portions of the energy storage device in the second direction and, at the same time, the distal ends of the pair of restricting portions opposedly face each other. Thus, at the end portions of the energy storage device in the second direction, a gap is formed between the distal ends of the projecting portions only by an amount equal to a gap formed between the pair of restricting portions which opposedly faces each other. Accordingly, leakage of a fluid (fluid which flows through a flow channel) from between the projecting portions respectively formed on the pair of restricting portions which opposedly face each other, that is, leakage of the fluid from between the energy storage device and the restricting portions (the first restricting portion and the second restricting portion whose distal ends are made to opposedly face each other) can be suppressed.

In the energy storage apparatus, the second portion and the fourth portion may respectively extend in the first direction at the same position in the third direction, the third portion may be disposed at the same position as the second portion and the fourth portion in the third direction, the first projecting portion may include a connecting portion which connects the first portion and the second portion to each other, and the connecting portion may be configured to continuously change a position thereof in the third direction as the connecting portion extends toward the second portion from the first portion.

With such a configuration, the connecting portion smoothly connects the first portion and the second portion disposed at different positions in the third direction. Accordingly, a bent portion is not formed on the first projecting portion and hence, leakage of the fluid from between the energy storage device and the first projecting portion can be preferably suppressed.

In the energy storage apparatus, it is preferable that the first base have a first bulging portion which is a plate-like portion and bulges toward the energy storage device in cross section taken along a plane which includes the first direction and the third direction, the first portion be disposed on the first bulging portion, the first base, the first restricting portion and the first projecting portion be formed as an integral body made of a resin, the connecting portion be disposed on a corner portion where the first bulging portion and the first restricting portion are connected to each other, and a size of the connecting portion in the third direction be smaller than a size of the first portion in the third direction.

With such a configuration, even when the first bulging portion is elongated (deformed) in the third direction due to an application of a force in the first direction to the first base or the like, the connecting portion made of a resin and having a small thickness (having a small size in the third direction) is deformed so that a change in relative position in the third direction between the first portion and the second portion is absorbed whereby leakage of a fluid from between the energy storage device and the connecting portion can be suppressed.

In the energy storage apparatus, the first portion may be disposed at a position closer to an end portion of the first base than the second portion, the third portion and the fourth portion in the third direction.

With such a configuration, only the first portion is disposed at the position closer to the end portion of the first base in the third direction (that is, the second to fourth portions are disposed at positions away from the end portion of the first base in the third direction) and hence, even when a size of the energy storage device in the third direction is smaller than a set value due to an error in size or the like, the second to fourth portions are easily brought into contact with the energy storage device whereby the increase in leakage of a fluid caused by the above-mentioned error in size or the like can be suppressed.

According to another aspect of the present invention, there is provided a spacer including: a base having a first surface which is directed toward one side in a first direction and a second surface which is directed toward the other side in the first direction, the first surface and the second surface expanding in a direction orthogonal to the first direction; a first restricting portion extending toward one side in the first direction from an end portion of the base in a second direction orthogonal to the first direction; a second restricting portion extending toward the other side in the first direction from the end portion of the base at the same position as the first restricting portion in a third direction orthogonal to the first direction and the second direction; a first projecting portion which projects from the first surface of the base and the first restricting portion; and a second projecting portion which projects from the second surface of the base and the second restricting portion, the first projecting portion includes: a first portion extending in the second direction on the first surface; and a second portion extending to a distal end of the first restricting portion from a base side on the first restricting portion, the first projecting portion being continuously formed at least from an end portion of the first portion on a first restricting portion side to a distal end of the second portion, the second projecting portion includes: a third portion extending in the second direction on the second surface and disposed at a position different from the first portion of the first projecting portion in the third direction; and a fourth portion extending to a distal end of the second restricting portion from a base side on the second restricting portion, the second projecting portion being continuously formed at least from an end portion of the third portion on a second restricting portion side to a distal end of the fourth portion, and the distal end of the second portion and the distal end of the fourth portion are disposed at the same position in the third direction.

With such a configuration, the spacer and the energy storage device are alternately arranged in the first direction and hence, even when a position in the third direction of the projecting portion (first portion) disposed on the first surface of the spacer and a position in the third direction of the projecting portion (third portion) disposed on the second surface of the spacer differ from each other, the spacers being oppositely face each other with the energy storage device interposed therebetween, the projecting portions (the first projecting portions and the second projecting portions) respectively extend to distal ends of the pair of restricting portions (the first restricting portion and the second restricting portion) which oppositely face each other at the end portions of the energy storage device in the second direction and, at the same time, the distal ends of the pair of restricting portions oppositely face each other whereby, at the end portions of the energy storage device in the second direction, a gap is formed between the distal ends of the projecting portions only by an amount equal to a gap formed between the pair of restricting portions which oppositely faces each other. Accordingly, leakage of a fluid (fluid which flows through a flow channel) from between the projecting portions respectively formed on the pair of restricting portions which oppositely face each other, that is, leakage of the fluid from between the energy storage device and the restricting portions (the first restricting portion and the second restricting portion whose distal ends are made to oppositely face each other) can be suppressed.

In the spacer, it is preferable that the base includes: a first bulging portion which is a plate-like portion and bulges toward one side in the first direction in cross section taken along a plane which includes the first direction and the third direction; and a second bulging portion which is a plate-like portion and bulges toward the other side in the first direction in cross section taken along a plane which includes the first direction and the third direction, the first bulging portion and the second bulging portion be disposed on the base at different positions in the third direction, the first portion be formed on the first bulging portion, the third portion be formed on the second bulging portion, the base, the first restricting portion, the second restricting portion, the first projecting portion and the second projecting portion be formed as an integral body made of a resin, the first projecting portion include a connecting portion which connects the first portion and the second portion to each other, and be disposed at a corner portion where the first bulging portion and the first restricting portion are connected to each other, and a size of the connecting portion in the third direction be smaller than a size of the first portion in the third direction.

With such a configuration, in alternately arranging the spacer and the energy storage device in the first direction, even when the first bulging portion is elongated (deformed) in the third direction due to an application of a force in the first direction to the first base or the like, the connecting portion made of a resin and having a small thickness (having a small size in the third direction) is deformed so that a change in relative position in the third direction between the first portion and the second portion is absorbed whereby leakage of a fluid from between the energy storage device and the connecting portion can be suppressed.

As has been described above, according to the present invention, it is possible to provide an energy storage apparatus where a fluid which flows between an energy storage device and a spacer minimally leaks to the outside from between the energy storage device and a restricting portion of the spacer, and a spacer used in the energy storage apparatus.

Hereinafter, one embodiment of the present invention will be described with reference to FIG. 1 to FIG. 17. Names of respective constitutional members (respective constitutional elements) of this embodiment are used only for this embodiment, and may differ from names of respective constitutional members (respective constitutional elements) used in BACKGROUND.

Figure 2:
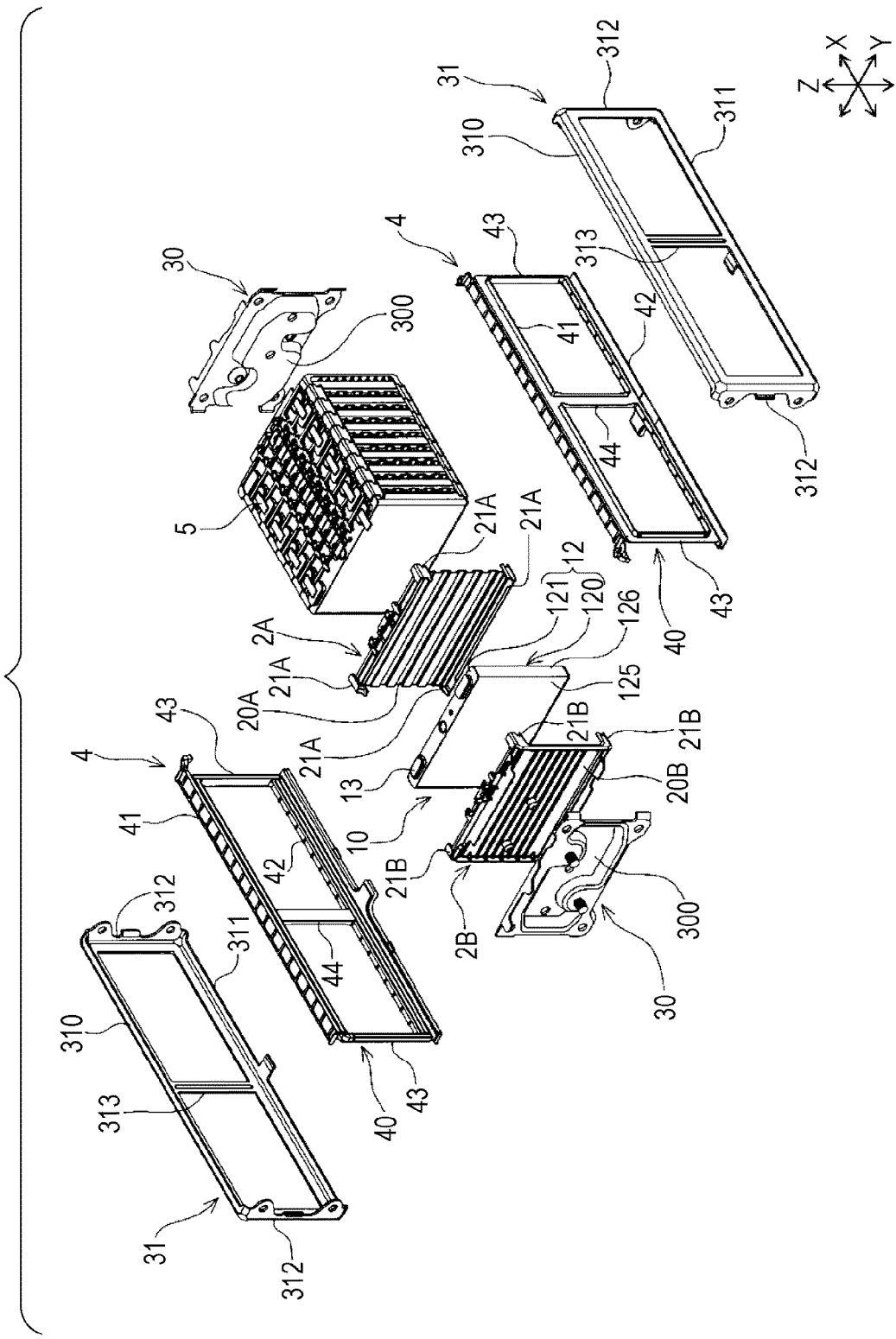
FIG. 2 is an exploded perspective view of the energy storage apparatus.

As shown in FIG. 1 and FIG. 2, an energy storage apparatus includes: a plurality of energy storage devices 10 arranged in a row in the predetermined direction (first direction), and a plurality of spacers 2A each of which is disposed between the energy storage devices 10 disposed adjacently to each other. The energy storage apparatus 1 of this embodiment also includes spacers 2B disposed outside the row of the energy storage devices 10 in a row direction. The energy storage apparatus 1 further includes a holder 3 which collectively holds the plurality of energy storage devices 10 and the plurality of spacers 2A, 2B, insulators 4 which are disposed between the energy storage devices 10 and the holder 3, and bus bars 5 each of which electrically connects external terminals 13 of each two energy storage devices 10 disposed adjacently to each other.

Figure 3:
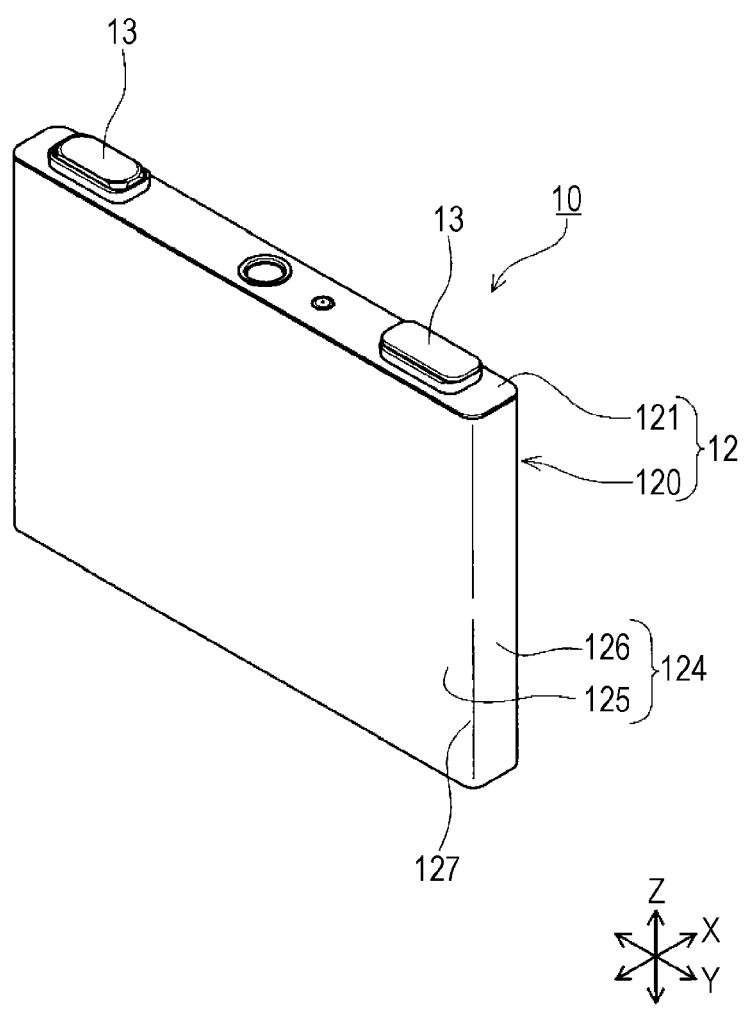
FIG. 3 is a perspective view of an energy storage device which the energy storage apparatus includes.
Figure 4:
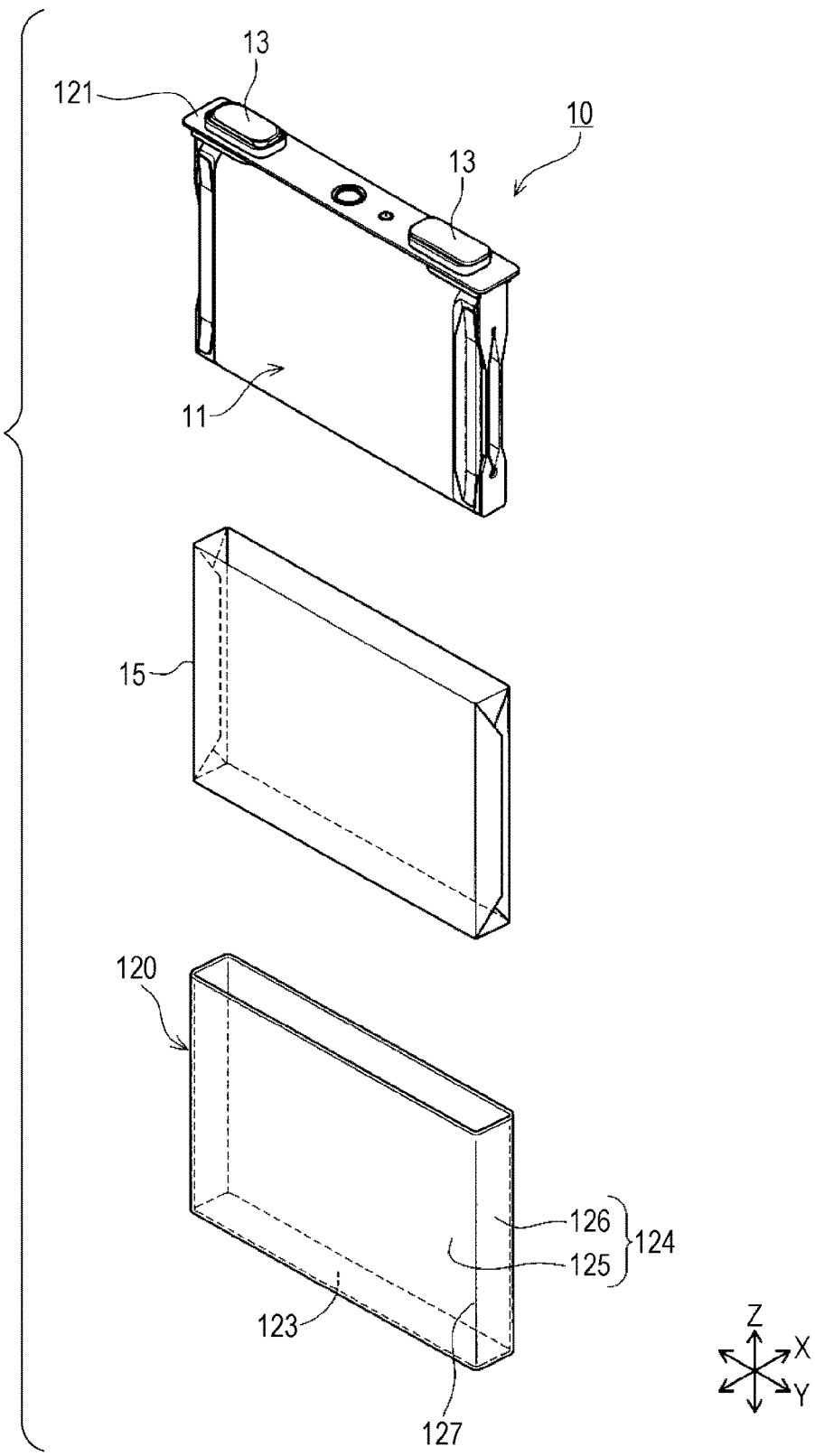
FIG. 4 is an exploded perspective view of the energy storage device.

As also shown in FIG. 3 and FIG. 4, each energy storage device 10 includes: an electrode assembly 11 which includes a positive electrode and a negative electrode; a case 12 which houses the electrode assembly 11; and a pair of external terminals 13 disposed on an outer surface of the case 12. The energy storage device 10 further includes an insulating member 15 or the like disposed between the electrode assembly 11 and the case 12.

The case 12 includes: a case body 120 having an opening; and a lid plate 121 which closes the opening of the case body 120.

The case body 120 includes: a plate-like closed portion 123; and a cylindrical barrel portion 124, which is connected to a periphery of the closed portion 123.

The barrel portion 124 includes: a pair of first walls 125 which oppositely faces each other with a distance therebetween; and a pair of second walls 126 which oppositely faces each other with the pair of first walls 125 interposed therebetween.

The first walls 125 and second walls 126 are respectively formed into a rectangular shape. The first wall 125 and the second wall 126 are disposed adjacently to each other in a state where end edges of the first wall 125 and the second wall 126 abut against each other. With respect to the first wall 125 and the second wall 126 which are disposed adjacently to each other, the end edge of the first wall 125 and the end edge of the second wall 126 are connected to each other over the entire length of the first and second walls 125, 126. Accordingly, the barrel portion 124 is formed into a prismatic cylindrical shape. One end of the barrel portion 124 is closed by the closed portion 123, and the other end of the barrel portion 124 is opened. That is, the case body 120 has a bottomed prismatic cylindrical shape. The barrel portion 124 in this embodiment is formed into a flat prismatic cylindrical shape. Each corner portion 127 of the barrel portion 124, that is, each connecting portion between the first wall 125 and the second wall 126 has an arcuate shape as viewed in the direction toward the opening.

The lid plate 121 is a plate-like member which closes the opening of the case body 120. To be more specific, the lid plate 121 has a profile shape which corresponds to a peripheral edge portion of the opening of the case body 120 as viewed in a normal direction. That is, the lid plate 121 is a plate member having a rectangular shape which extends in one direction (the direction along which the pair of second walls 126 opposedly face each other) as viewed in the normal direction. Four corners of the lid plate 121 have an arcuate shape.

With respect to the case 12 in this embodiment, a boundary portion between the lid plate 121 and the case body 120 is welded in a state where a peripheral edge portion of the lid plate 121 is made to overlap with the peripheral edge portion of the opening of the case body 120 so that the opening of the case body 120 is closed.

As described previously, the energy storage apparatus 1 of this embodiment includes the plurality of energy storage devices 10 arranged in a row in one direction. The plurality of energy storage devices 10 are arranged in a row in a state where the first wall 125 of the case 12 of each energy storage device 10 are directed in one direction.

In the description made hereinafter, the direction along which the energy storage devices 10 are arranged in a row (first direction) is referred to as "X axis direction" in orthogonal coordinates. Further, the direction along which the second walls 126 of the energy storage device 10 opposedly face each other (second direction) is referred to as "Y axis direction" in orthogonal coordinates, and the direction along which the lid plate 121 and the closed portion 123 opposedly face each other (third direction) is referred to as "Z axis direction" in orthogonal coordinates. In accordance with such orthogonal coordinates, orthogonal coordinate axes which respectively correspond to the X axis direction, the Y axis direction and the Z axis direction are described auxiliarily in the respective drawings.

As described previously, the energy storage apparatus 1 of this embodiment includes two kinds of spacers 2A, 2B. To be more specific, the energy storage apparatus 1 includes inner spacers 2A each of which is disposed between two energy storage devices 10 disposed adjacently to each other; and outer spacers 2B which are disposed adjacently to the outermost energy storage devices 10 out of the plurality of energy storage devices 10. In this embodiment, the inner spacers 2A and the outer spacers 2B are made of a resin, and are formed integrally respectively.

As also shown in FIG. 5 to FIG. 12, each inner spacer 2A includes: a base 20A disposed adjacently to the energy storage devices 10 (to be more specific, the first walls 125 of the case bodies 120); and restricting portions 21A which prevent the positional displacement of two energy storage devices 10 disposed adjacently to the base 20A with respect to the base 20A. The inner spacer 2A also includes a pair of sealing portions (projecting portions) 22 which projects to the energy storage devices 10 disposed adjacently to the inner spacer 2A from the base 20A and the restricting portions 21A on both sides in the X axis direction of the inner spacer 2A and is brought into contact with the energy storage devices 10 disposed adjacently to the inner spacer 2A. The inner spacer 2A in this embodiment includes the pair of sealing portions 22 at both end portions thereof in the Z axis direction. Hereinafter, the sealing portion disposed close to the lid plate 121 of the energy storage device 10 in the Z axis direction is referred to as "lid-side sealing portion 23A, 23B", and the sealing portion disposed close to the closed portion 123 of the energy storage device 10 is referred to as "bottom-side sealing portion 24A, 24B".

The base 20A of the inner spacer 2A expands in a direction orthogonal to the X axis direction (the direction along the Y-Z plane (a plane including a Y axis and a Z axis)) between the energy storage devices 10 disposed adjacently to each other. Flow channels through which a fluid is allowed to flow are formed in at least one space out of spaces formed between the base 20A and the energy storage devices 10 disposed adjacently to the base 20A on both sides in the X axis direction. The base 20A has a first surface (a surface shown in FIG. 5) directed to one side in the X axis direction, and a second surface (a surface shown in FIG. 6) directed to a side opposite to the side which the first surface is directed.

The base 20A has a first end (an upper end in FIG. 5) disposed at a position which corresponds to the lid plate 121 of the energy storage device 10, and a second end (a lower end in FIG. 5) disposed on a side opposite to the first end at a position which corresponds to the closed portion 123 of the energy storage device 10. The base 20A of the inner spacer 2A also has a third end (a left end in FIG. 5) disposed at a position which corresponds to the second wall 126 of the energy storage device 10 on one side, and a fourth end (a right end in FIG. 5) disposed on a side opposite to the third end at a position which corresponds to the second wall 126 of the energy storage device 10 on the other side.

The base 20A has a first corner portion (an upper left corner portion in FIG. 5) where the first end and the third end of the base 20A are connected to each other, and a second corner portion (an upper right corner portion in FIG. 5) where the first end and the fourth end of the base 20A are connected to each other. The base 20A also has a third corner portion (a lower left corner portion in FIG. 5) where the second end and the third end of the base 20A are connected to each other, and a fourth corner portion (a lower right corner portion in FIG. 5) where the second end and the fourth end of the base 20A are connected to each other.

The first end and the second end of the base 20A extend in the Y axis direction respectively. The third end and the fourth end of the base 20A extend in the Z axis direction respectively. Accordingly, the base 20A has an approximately rectangular profile as viewed in the X axis direction. The profile of the base 20A has substantially the same size as the first wall 125 of the energy storage device 10 as viewed in the X axis direction.

With respect to the base 20A, the flow channels which allow a fluid (a fluid for adjusting a temperature of the energy storage devices 10, for example) to pass therethrough are formed in at least between the first surface of the base 20A and the energy storage device 10 disposed adjacently to the first surface and between the second surface of the base 20A and the energy storage device 10 disposed adjacently to the second surface.

In this embodiment, the flow channels are formed on both sides (a first surface side and a second surface side) of the base 20A in the X axis direction. To be more specific, the base 20A is formed into a rectangular corrugated shape (see FIG. 7). Each base 20A includes: first contact portions 200A which are brought into contact with only one energy storage device 10 out of two energy storage devices 10 disposed adjacently to the base 20A; second contact portions 201A which are brought into contact with only the other energy storage device 10 out of two energy storage devices 10 disposed adjacently to the base 20A; and connection portions 202A each of which connects the first contact portion 200A and the second contact portion 201A to each other. The detailed description is made hereinafter.

The base 20A includes a plurality of first contact portions 200A and a plurality of second contact portions 201A. The first contact portions 200A and the second contact portions 201A have a rectangular shape elongated in the Y axis direction respectively. The first contact portions 200A and the second contact portions 201A are disposed at positions different from each other in the X axis direction, and are alternately arranged in the Z axis direction. Accordingly, flow channels are formed by surfaces of the first contact portions 200A on a side opposite to surfaces of the first contact portions 200A which are brought into contact with the energy storage device 10, pairs of connection portions 202A each pair of which is connected to both ends of the first contact portion 200A in the Z axis direction, and the energy storage device 10 which is brought into contact with the second contact portions 201A. Further, flow channels are formed by surfaces of the second contact portions 201A on a side opposite to surfaces of the second contact portions 201A which are brought into contact with the energy storage device 10, pairs of connection portions 202A each pair of which is connected to both ends of the second contact portion 201A in the Z axis direction, and the energy storage device 10 which is brought into contact with the first contact portions 200A. With such a configuration, the flow channels are formed between the first surface of the base 20A and the energy storage device 10 disposed adjacently to the first surface and between the second surface of the base 20A and the energy storage device 10 disposed adjacently to the second surface respectively. The respective flow channels having the above-mentioned configuration allow a fluid to flow therethrough in the Y axis direction.

Figure 7:
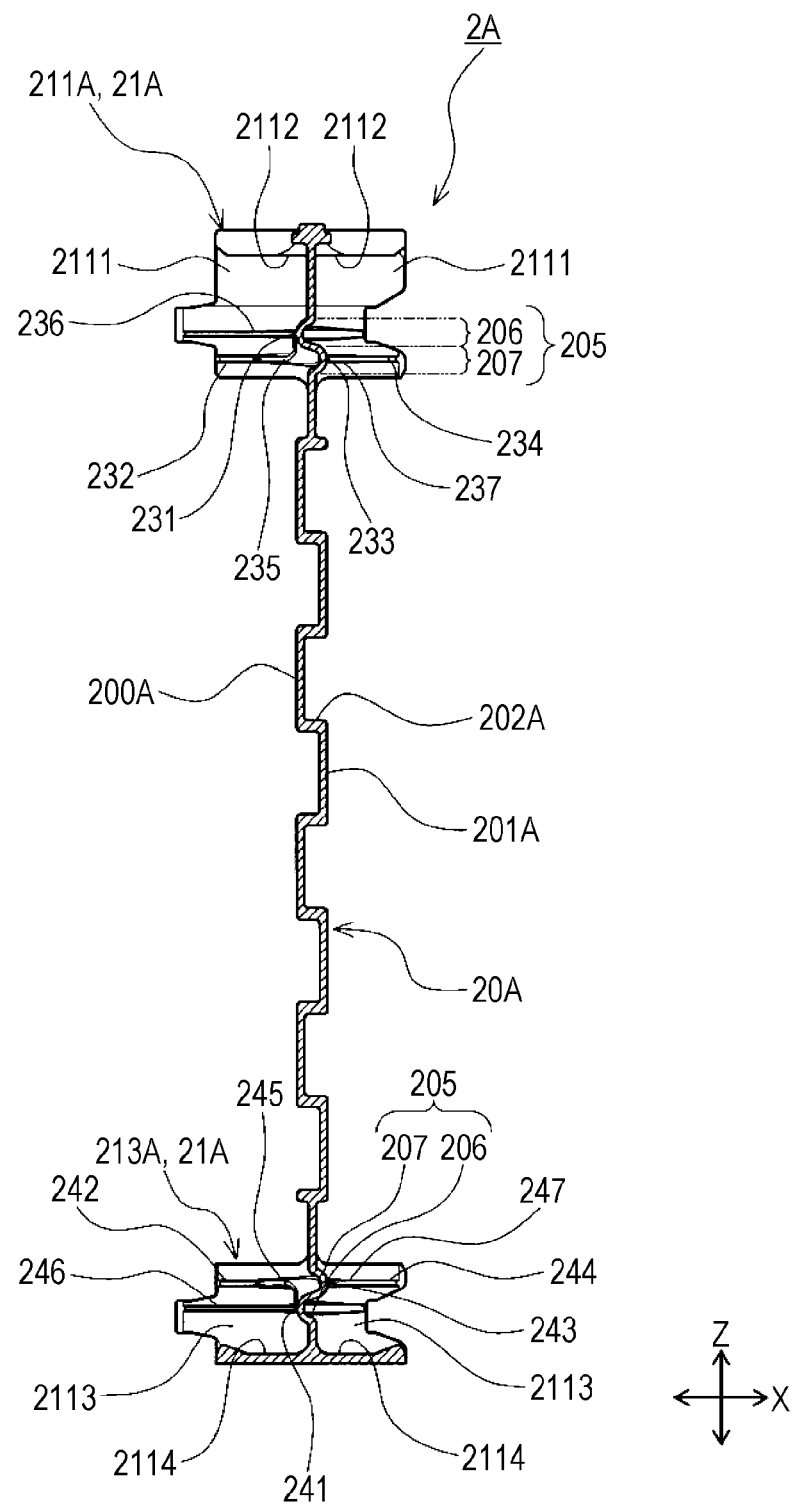
FIG. 7 is a cross-sectional view of the inner spacer taken along a line VII-VII in FIG. 5.

The base 20A also includes bent portions (a first bulging portion and a second bulging portion) 205 extending in the Y axis direction at both end portions thereof in the Z axis direction respectively. As shown in FIG. 7, as viewed in cross section in the X-Z plane (a plane including an X axis and a Z axis) direction, each bent portion 205 is an S-shaped portion where one bulging portion bulges toward one side (a first surface side of the base 20A) in the X axis direction, and the other bulging portion bulges toward the other side (a second surface side of the base 20A) in the X axis direction, and one bulging portion and the other bulging portion bulge at positions different from each other in the Z axis direction. To be more specific, the bent portion 205 includes the first bulging portion 206 which is a plate-like portion and bulges toward one side (a left side in the embodiment shown in FIG. 7) in the X axis direction in cross section taken along an X-Z plane, and a second bulging portion 207 which is a plate-like portion and bulges toward the other side (a right side in the embodiment shown in FIG. 7) in the X axis direction in cross section taken along the X-Z plane. The first bulging portion 206 and the second bulging portion 207 are continuously formed with each other in the Z axis direction. In the X axis direction, the portion (first bulging portion) 206 of the bent portion 205 which bulges toward one side bulges such that an end portion (a distal end in the bulging direction) of the portion 206 reaches the position of the first contact portion 200A or exceeds the position of the first contact portion 200A. The portion (second bulging portion) 207 of the bent portion 205 which bulges toward the other side bulges such that an end portion (a distal end in the bulging direction) of the portion 207 reaches the position of the second contact portion 201A or exceeds the position of the second contact portion 201A.

As shown in FIG. 2, FIG. 5 to FIG. 11, the restricting portions 21A extend toward both sides in the X axis direction from the base 20A along end portions of the energy storage devices 10 disposed adjacently to the base 20A in the Y axis direction. That is, the restricting portions 21A extend from the base 20A toward the energy storage device 10 disposed adjacently to the first surface of the base 20A and toward the energy storage device 10 disposed adjacently to the second surface of the base 20A. The restricting portions 21A of the inner spacers 2A disposed on both sides in the X axis direction of the energy storage device 10 which correspond to each other have distal ends thereof oppositely face each other (see FIG. 12). As described previously, the restricting portions 21A prevent the positional displacement of two energy storage devices 10 disposed adjacently to the base 20A with respect to the base 20A in the Y-Z plane direction. Accordingly, the restricting portions 21A restrict the relative movement between two energy storage devices 10 disposed adjacently to the inner spacer 2A in the Y-Z plane direction.

The description is made more specifically. The restricting portion 21A is formed at respective corner portions of the base 20A. That is, each inner spacer 2A has a plurality of (four in this embodiment) restricting portions 21A. To be more specific, the inner spacer 2A includes: a first corner restricting portion 211A formed at the first corner portion; a second corner restricting portion 212A formed at the second corner portion; a third corner restricting portion 213A formed at the third corner portion; and a fourth corner restricting portion 214A formed at the fourth corner portion. Hereinafter, a portion of each of the corner restricting portions 211A to 214A which extend on one side (a left side in FIG. 2) in the X axis direction is also referred to as "first restricting portion", and a portion of each of the corner restricting portions 211A to 214A which extend on the other side (a right side in FIG. 2) in the X axis direction is also referred to as "second restricting portion".

Figure 8:
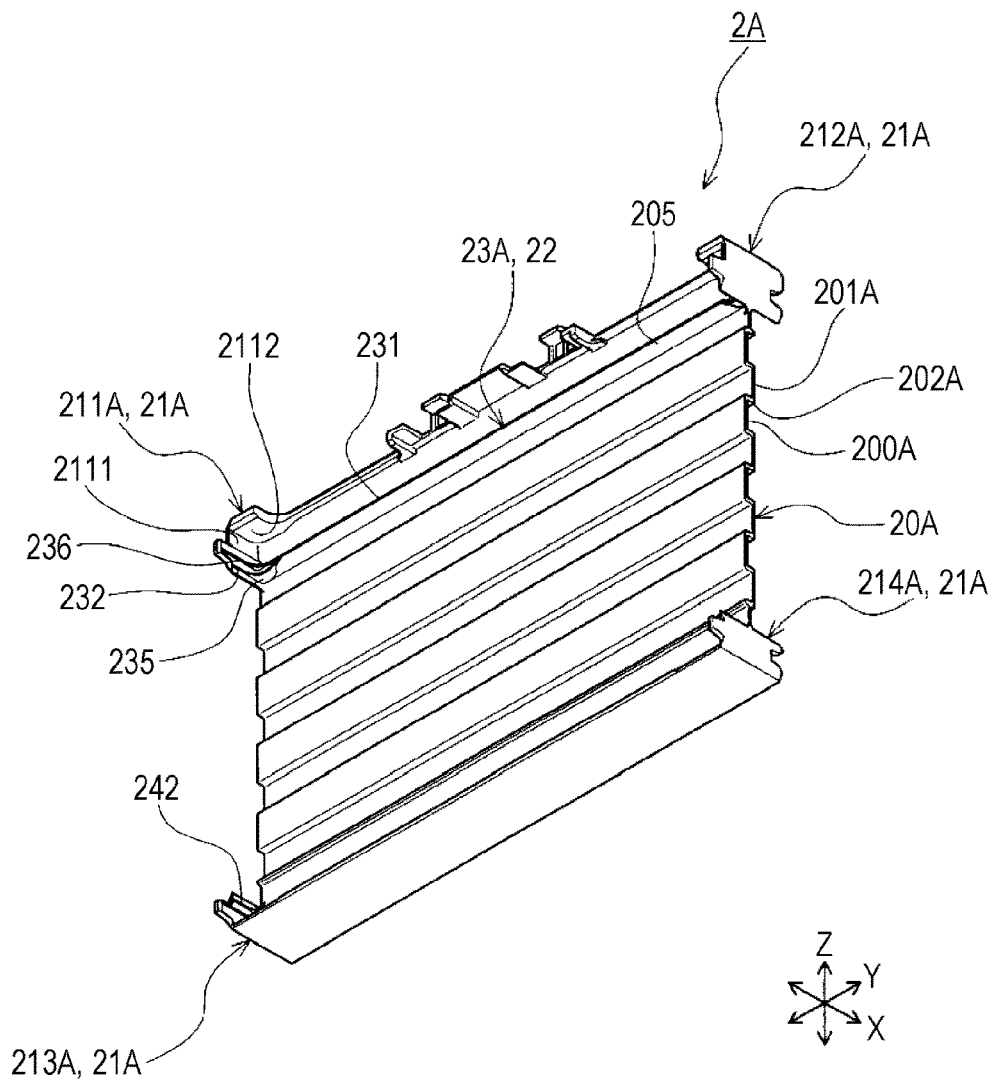
FIG. 8 is a perspective view of the inner spacer as viewed from the first surface side.

The first corner restricting portion 211A has a first opposedly facing surface 2111 which extends along one-side second walls 126 of the barrel portions 124 of the energy storage devices 10 disposed on both sides in the X axis direction of the base 20A and oppositely faces one-side second walls 126 (see FIG. 8). The first corner restricting portion 211A also has a second oppositely facing surface 2112 which extends along the lid plates 121 of the energy storage devices 10 disposed on both sides in the X axis direction of the base 20A and oppositely faces the lid plates 121. The first oppositely facing surface 2111 and the second oppositely facing surface 2112 of the first corner restricting portion 211A are connected to each other. The first corner restricting portions 211A of the inner spacers 2A disposed on both sides in the X axis direction of the energy storage device 10 have distal ends thereof oppositely face each other (see FIG. 12). That is, with respect to two inner spacers 2A disposed adjacently to each other with the energy storage device 10 interposed therebetween, a distal end of the first corner restricting portion 211A (to be more specific, a first restricting portion) of one inner spacer 2A and the distal end of the first corner restricting portion 211A (to be more specific, a second restricting portion) of the other inner spacer 2A are made to oppositely face each other.

The second corner restricting portion 212A has a first oppositely facing surface 2111 which extends along the other-side second walls 126 of the barrel portions 124 of the energy storage devices 10 disposed on both sides in the X axis direction of the base 20A, and corresponds to the other-side second walls 126. The second corner restricting portion 212A also has a second oppositely facing surface 2112 which extends along the lid plates 121 of the energy storage devices 10 disposed on both sides in the X axis direction of the base 20A, and oppositely faces the lid plates 121. The first oppositely facing surface 2111 and the second oppositely facing surface 2112 of the second corner restricting portion 212A are connected to each other. The second corner restricting portions 212A of the inner spacers 2A disposed on both sides in the X axis direction of the energy storage device 10 have distal ends thereof oppositely face each other (see FIG. 2). That is, with respect to two inner spacers 2A disposed adjacently to each other with the energy storage device 10 interposed therebetween, a distal end of the second corner restricting portion 212A (to be more specific, a first restricting portion) of one inner spacer 2A and a distal end of the second corner restricting portion 212A (to be more specific, a second restricting portion) of the other inner spacer 2A are made to opposedly face each other.

The third corner restricting portion 213A has a third opposedly facing surface 2113 which extends along one-side second walls 126 of the barrel portions 124 of the energy storage devices 10 disposed on both sides in the X axis direction of the base 20A, and opposedly faces one-side second walls 126 (see FIG. 10). The third corner restricting portion 213A also has a fourth opposedly facing surface 2114 which extends along the closed portions 123 of the energy storage devices 10 disposed on both sides in the X axis direction of the base 20A, and opposedly faces the closed portions 123. The third opposedly facing surface 2113 and the fourth opposedly facing surface 2114 of the third corner restricting portion 213A are connected to each other. The third corner restricting portions 213A of the inner spacers 2A disposed on both sides in the X axis direction of the energy storage device 10 have distal ends thereof opposedly face each other (see FIG. 12). That is, with respect to two inner spacers 2A disposed adjacently to each other with the energy storage device 10 interposed therebetween, the distal end of the third corner restricting portion 213A (to be more specific, a first restricting portion) of one inner spacer 2A and the distal end of the third corner restricting portion 213A (to be more specific, a second restricting portion) of the other inner spacer 2A are made to opposedly face each other.

The fourth corner restricting portion 214A has a third opposedly facing surface 2113 which extends along the other-side second walls 126 of the barrel portions 124 of the energy storage devices 10 disposed on both sides in the X axis direction of the base 20A, and opposedly faces the other-side second walls 126. The fourth corner restricting portion 214A also has a fourth opposedly facing surface 2114 which extends along the closed portions 123 of the energy storage devices 10 disposed on both sides in the X axis direction of the base 20A, and opposedly faces the closed portions 123. The third opposedly facing surface 2113 and the fourth opposedly facing surface 2114 of the fourth corner restricting portion 214A are connected to each other. The fourth corner restricting portions 214A of the inner spacers 2A disposed on both sides in the X axis direction of the energy storage device 10 have distal ends thereof opposedly face each other (see FIG. 2). That is, with respect to two inner spacers 2A disposed adjacently to each other with the energy storage device 10 interposed therebetween, the distal end of the fourth corner restricting portion 214A (to be more specific, a first restricting portion) of one inner spacer 2A and the distal end of the fourth corner restricting portion 211A (to be more specific, a second restricting portion) of the other inner spacer 2A are made to opposedly face each other.

In this embodiment, the third corner restricting portion 213A and the fourth corner restricting portion 214A extend along the second end of the base 20A and are connected to each other. That is, the fourth opposedly facing surface 2114 of the third corner restricting portion 213A and the fourth opposedly facing surface 2114 of the fourth corner restricting portion 214A are continuously connected to each other in the Y axis direction. That is, the fourth opposedly facing surface 2114 of the third corner restricting portion 213A and the fourth opposedly facing surface 2114 of the fourth corner restricting portion 214A form a common surface.

Figure 5:
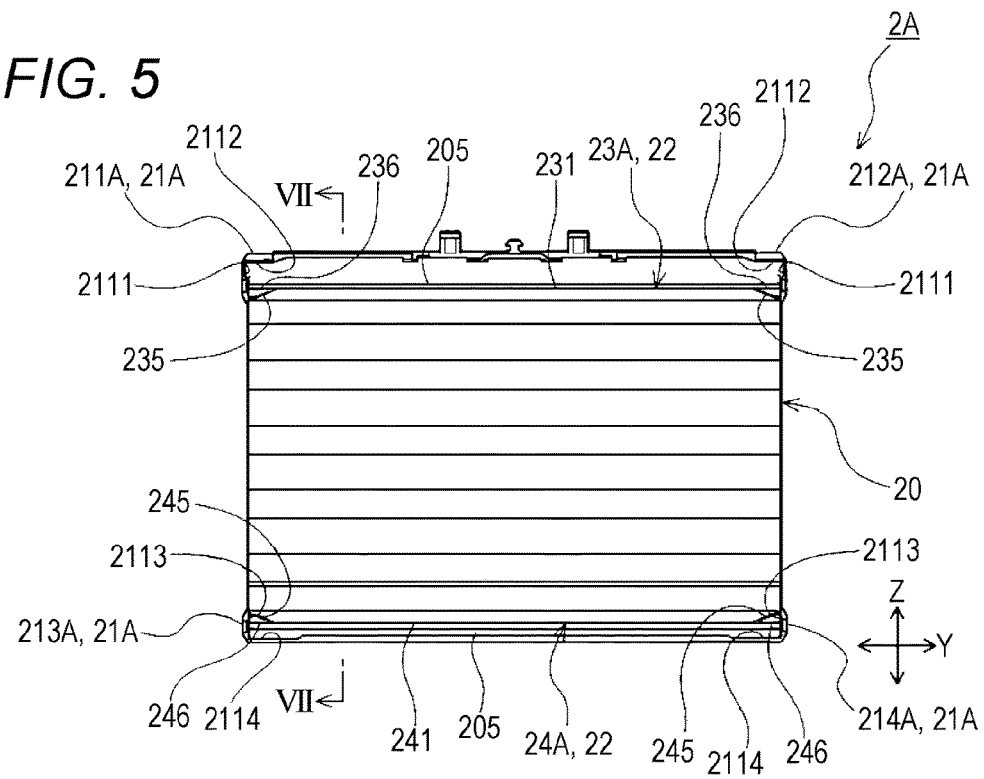
FIG. 5 is a front view of an inner spacer which the energy storage apparatus includes as viewed from a first surface side.
Figure 6:
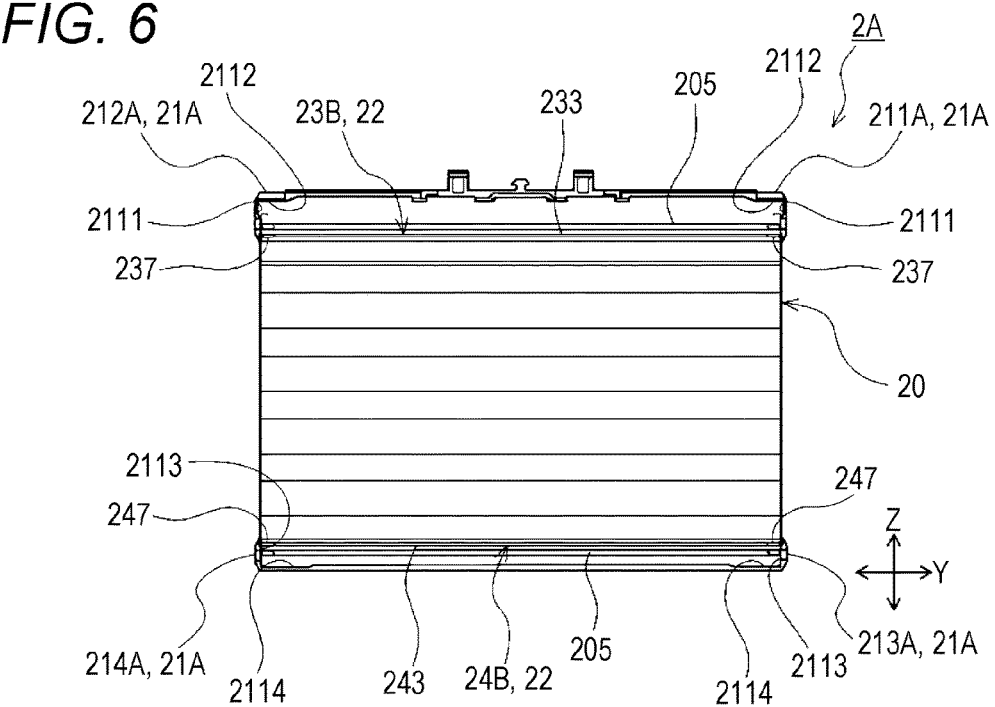
FIG. 6 is a front view of the inner spacer as viewed from a second surface side.

As shown in FIG. 5 to FIG. 7, a pair of the sealing portions (projecting portions) 22 extends in the Y axis direction on the first surface and the second surface of the base 20A respectively at positions different from each other in the Z axis direction, and continuously extends to distal ends of the restricting portions 21A. In the pair of oppositely facing restricting portions 21A (the first restricting portion and the second restricting portion) of the inner spacers 2A disposed with the energy storage device 10 interposed therebetween, distal ends of the sealing portions 22 extending to the distal ends of the restricting portions 21A opposedly face each other (see FIG. 12).

Hereinafter, a pair of lid-side sealing portions 23A, 23B and a pair of bottom-side sealing portions 24A, 24B are described in detail.

As shown in FIG. 5, FIG. 7, FIG. 8, FIG. 12 and FIG. 13, the lid-side sealing portion 23A on a first surface side of the base 20A (hereinafter referred to as "first lid-side sealing portion") includes a first portion 231 disposed on the base 20A, and second portions 232 disposed on the first corner restricting portion 211A (to be more specific, the first restricting portion of the first corner restricting portion 211A) and the second corner restricting portion 212A (to be more specific, the first restricting portion of the second corner restricting portion 212A) respectively. The first lid-side sealing portion 23A further includes first connecting portions 235 each of which connects the first portion 231 and the second portion 232 to each other. In this embodiment, the first lid-side sealing portion 23A also includes extending portions 236 which extend in the X axis direction from an end portion of the first portion 231 at substantially the same position as the first corner restricting portion 211A and the second corner restricting portion 212A in the Z axis direction.

The first portion 231 of the first lid-side sealing portion 23A is disposed on the bent portion 205 of the base 20A at the position where the bent portion 205 bulges to the first surface side (one side). To be more specific, as shown in FIG. 5, FIG. 7 and FIG. 8, the first portion 231 extends in the Y axis direction at a distal end (the distal end in the bulging direction) of the first bulging portion 206 of the bent portion 205 disposed on one end portion (an upper end portion in FIG. 7) in the Z axis direction of the base 20A.

Figure 13:
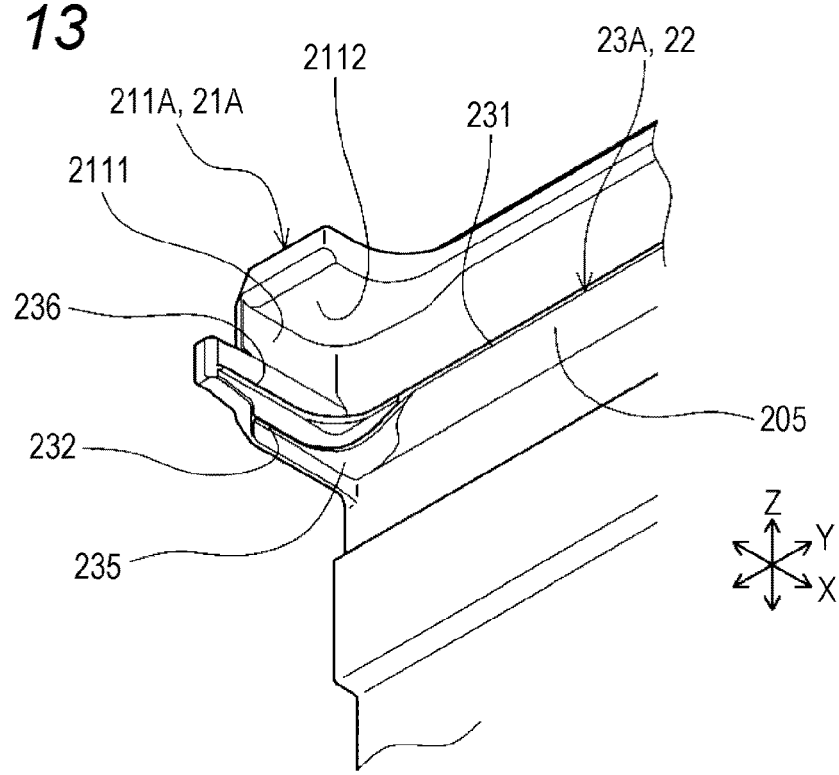
FIG. 13 is an enlarged perspective view of a first corner restricting portion of the inner spacer and an area around the first corner restricting portion.

As shown in FIG. 7, FIG. 8 and FIG. 13, the second portions 232 of the first lid-side sealing portion 23A are disposed on the first corner restricting portion 211A and the second corner restricting portion 212A respectively at positions different from the position of the first portion 231 in the Z axis direction. In this embodiment, the second portions 232 are disposed at the positions closer to a closed portion 123 side (a lower end side in FIG. 7) than the first portion 231 is in the Z axis direction. The second portions 232 extend in the X axis direction on the first opposedly facing surfaces 2111 of the first corner restricting portion 211A and the second corner restricting portion 212A.

The first connecting portion 235 of the first lid-side sealing portion 23A is a portion which is brought into contact with the corner portion 127 of the case 12 of the energy storage device 10. As shown in FIG. 5, FIG. 7, FIG. 8 and FIG. 13, the first connecting portion 235 (to be more specific, a distal end of the first connecting portion 235) continuously changes the position thereof in the Z axis direction toward the second portion 232 from the first portion 231. In this embodiment, the first connecting portion 235 continuously changes the position thereof in the Z axis direction toward a closed portion 123 side as the first connecting portion 235 extends to an end portion of the second portion 232 from an end portion of the first portion 231. The first connecting portion 235 is disposed at a corner portion where the bent portion 205 and the first corner restricting portion 211A or the second corner restricting portion 212A are connected to each other. A thickness (a size in the Z axis direction) of the first connecting portion 235 is smaller than a thickness of the first portion 231 formed continuously with the first connecting portion 235 and a thickness of the second portion 232 formed continuously with the first connecting portion 235. With such a configuration, the first connecting portion 235 is deformable. The distal end (end edge) of each first connecting portion 235 is formed into an arcuate shape having a radius of curvature larger than a radius of curvature of the corner portion 127 of the case 12.

The extending portion 236 of the first lid-side sealing portion 23A continuously extends from the end portion of the first portion 231 to the distal end of the first corner restricting portion 211A or to the distal end of the second corner restricting portion 212A.

As shown in FIG. 6, FIG. 7, FIG. 9 and FIG. 14, the lid-side sealing portion 23B on a second surface side of the base 20A (hereinafter referred to as "second lid-side sealing portion") includes a third portion 233 disposed on the base 20A and fourth portions 234 disposed on the first corner restricting portion 211A (to be more specific, the second restricting portion of the first corner restricting portion 211A) and the second corner restricting portion 212A (to be more specific, the second restricting portion of the second corner restricting portion 212A). The second lid-side sealing portion 23B further includes second connecting portions 237 each of which connects the third portion 233 and the fourth portion 234 to each other.

The third portion 233 of the second lid-side sealing portion 23B is disposed on the bent portion 205 of the base 20A at the position where the bent portion 205 bulges to a second surface side (the other side). That is, the third portion 233 of the second lid-side sealing portion 23B is disposed closer to a closed portion 123 side than the first portion 231 of the first lid-side sealing portion 23A is in the Z axis direction. To be more specific, as shown in FIG. 6, FIG. 7 and FIG. 9, the third portion 233 extends in the Y axis direction at a distal end (the distal end in the bulging direction) of the second bulging portion 207 of the bent portion 205 disposed on one end portion (an upper end portion in FIG. 7) in the Z axis direction of the base 20A.

Figure 9:
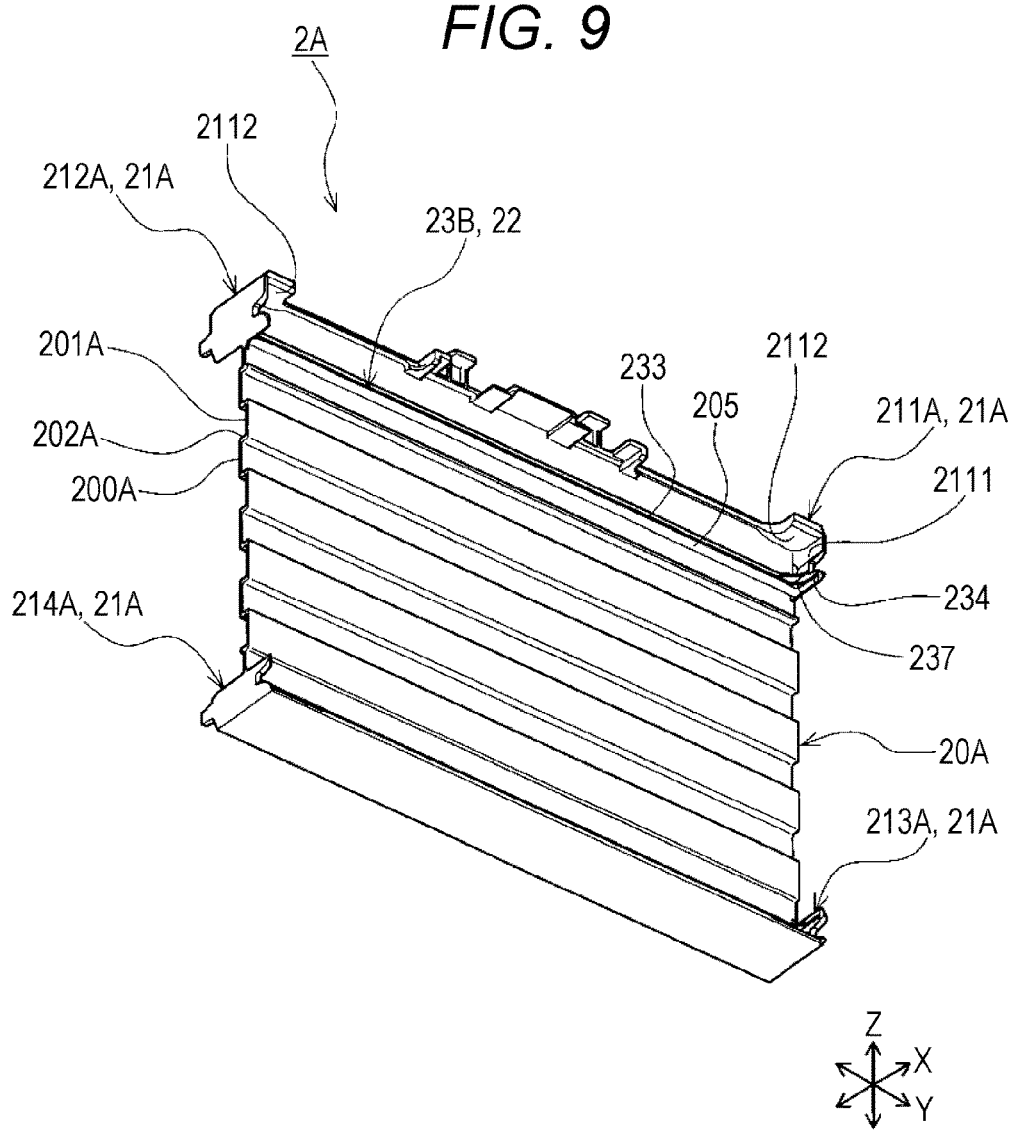
FIG. 9 is a perspective view of the inner spacer as viewed from the second surface side.
Figure 14:
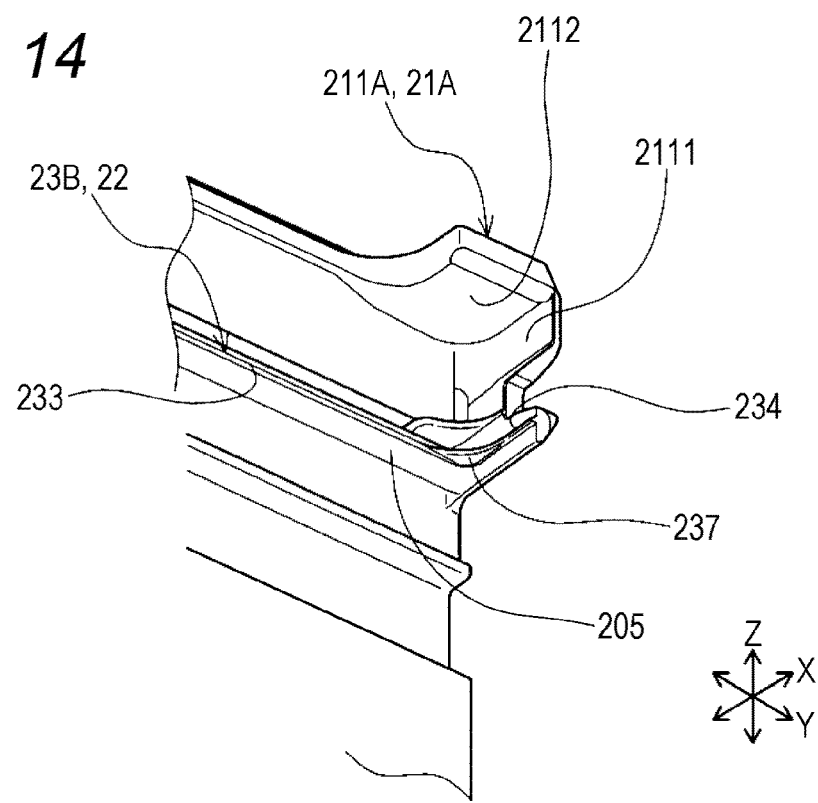
FIG. 14 is an enlarged perspective view of a second corner restricting portion of the inner spacer and an area around the second corner restricting portion.

As shown in FIG. 7, FIG. 9 and FIG. 14, the fourth portions 234 of the second lid-side sealing portion 23B are disposed on the first corner restricting portion 211A and the second corner restricting portion 212A respectively at the same position as the third portion 233 in the Z axis direction. The fourth portions 234 extend in the X axis direction on the second opposedly facing surfaces 2112 of the first corner restricting portion 211A and the second corner restricting portion 212A which opposedly face the second wall 126 of the energy storage device 10.

The second connecting portions 237 of the second lid-side sealing portion 23B are portions which are brought into contact with the corner portions 127 of the case 12 of the energy storage device 10. As shown in FIG. 6, FIG. 7, FIG. 9 and FIG. 14, each second connecting portion 237 connects the third portion 233 and the fourth portion 234 disposed at the same position in the Z axis direction to each other at a corner portion where the bent portion 205 and the first corner restricting portion 211A or the second corner restricting portion 212A are connected to each other. A thickness (a size in the Z axis direction) of the second connecting portion 237 is equal to a thickness of the third portion 233 formed continuously with the second connecting portion 237 and a thickness of the fourth portion 234 formed continuously with the second connecting portion 237. The second connecting portion 237 is deformable. The distal end (end edge) of each second connecting portion 237 is formed into an arcuate shape having a radius of curvature larger than a radius of curvature of the corner portion 127 of the case 12.

The second lid-side sealing portion 23B (the third portion 233 and the fourth portions 234) having the above-mentioned configuration is disposed at the same position as the second portions 232 of the first lid-side sealing portion 23A in the Z axis direction. In the inner spacers 2A disposed with the energy storage device 10 interposed therebetween, the first corner restricting portions 211A oppositely face each other, and a distal end of the first lid-side sealing portion 23A extending to the distal end of the first corner restricting portion 211A and a distal end of the second lid-side sealing portion 23B extending to the distal end of the first corner restricting portion 211A oppositely face each other. Furthermore, in the inner spacers 2A disposed with the energy storage device 10 interposed therebetween, the second corner restricting portions 212A oppositely face each other, a distal end of the first lid-side sealing portion 23A extending to a distal end of the second corner restricting portion 212A and a distal end of the second lid-side sealing portion 23B extending to the distal end of the second corner restricting portion 212A oppositely face each other (see FIG. 12).

As shown in FIG. 5, FIG. 7, FIG. 10, FIG. 12 and FIG. 15, the bottom-side sealing portion 24A on the first surface side of the base 20A (hereinafter referred to as "first bottom-side sealing portion") includes a first portion 241 disposed on the base 20A, and second portions 242 disposed on the third corner restricting portion 213A (to be more specific, a first restricting portion of the third corner restricting portion 213A) and the fourth corner restricting portion 214A (to be more specific, a first restricting portion of the fourth corner restricting portion 214A) respectively. The first bottom-side sealing portion 24A further includes first connecting portions 245 each of which connects the first portion 241 and the second portion 242 to each other. In this embodiment, the first bottom-side sealing portion 24A also includes extending portions 246 which extend in the X axis direction from an end portion of the first portion 241 at substantially the same position as the third corner restricting portion 213A and the fourth corner restricting portion 214A in the Z axis direction.

The first portion 241 of the first bottom-side sealing portion 24A is disposed on the bent portion 205 of the base 20A at the position where the bent portion 205 bulges to the first surface side (one side). To be more specific, as shown in FIG. 5, FIG. 7 and FIG. 10, the first portion 241 extends in the Y axis direction at a distal end (the distal end in the bulging direction) of the first bulging portion 206 of the bent portion 205 disposed on the other end portion (a lower end portion in FIG. 7) in the Z axis direction of the base 20A.

Figure 15:
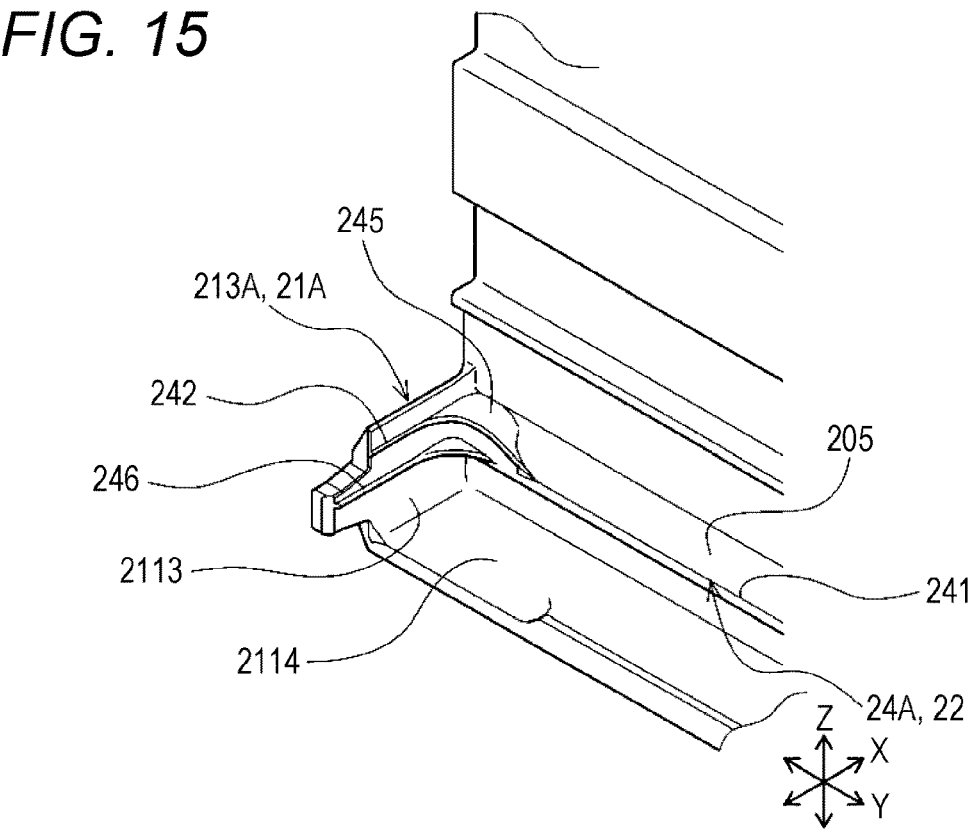
FIG. 15 is an enlarged perspective view of a third corner restricting portion of the inner spacer and an area around the third corner restricting portion.

As shown in FIG. 7, FIG. 10 and FIG. 15, the second portions 242 of the first bottom-side sealing portion 24A are disposed on the third corner restricting portion 213A and the fourth corner restricting portion 214A respectively at positions different from the position of the first portion 241 in the Z axis direction. In this embodiment, the second portions 242 are disposed at the positions closer to a lid plate 121 side than the first portion 241 is in the Z axis direction. The second portions 242 extend in the X axis direction on the third oppositely facing surfaces 2113 of the third corner restricting portion 213A and the fourth corner restricting portion 214A which oppositely face the second walls 126 of the energy storage device 10.

As shown in FIG. 5, FIG. 7, FIG. 10 and FIG. 15, the first connecting portion 245 of the first bottom-side sealing portion 24A continuously changes the position thereof in the Z axis direction toward the second portion 242 from the first portion 241. In this embodiment, the first connecting portion 245 (to be more specific, a distal end of the first connecting portion 245) continuously changes the position thereof in the Z axis direction toward a lid plate 121 side (an upper end side in FIG. 7) as the first connecting portion 245 extends to an end portion of the second portion 242 from an end portion of the first portion 241. The first connecting portion 245 is disposed at a corner portion where the bent portion 205 and the third corner restricting portion 213A or the fourth corner restricting portion 214A are connected to each other. A thickness (a size in the Z axis direction) of the first connecting portion 245 is smaller than a thickness of the first portion 241 formed continuously with the first connecting portion 245 and a thickness of the second portion 242 formed continuously with the first connecting portion 245. With such a configuration, the first connecting portion 245 is deformable. The distal end (end edge) of each first connecting portion 245 is formed into an arcuate shape having a radius of curvature larger than a radius of curvature of the corner portion 127 of the case 12.

The extending portion 246 of the first bottom-side sealing portion 24A continuously extends from the end portion of the first portion 241 to a distal end of the third corner restricting portion 213A or to a distal end of the fourth corner restricting portion 214A.

As shown in FIG. 6, FIG. 7, FIG. 11 and FIG. 16, the bottom-side sealing portion 24B on a second surface side of the base 20A (hereinafter referred to as "second bottom-side sealing portion") includes a third portion 243 disposed on the base 20A and fourth portions 244 disposed on the third corner restricting portion 213A (to be more specific, the second restricting portion of the third corner restricting portion 213A) and the fourth corner restricting portion 214A (to be more specific, the second restricting portion of the fourth corner restricting portion 214A). The second bottom-side sealing portion 24B further includes second connecting portions 247 each of which connects the third portion 243 and the fourth portion 244 to each other.

The third portion 243 of the second bottom-side sealing portion 24B is disposed on the bent portion 205 of the base 20A at the position where the bent portion 205 bulges to a second surface side (the other side). That is, the third portion 243 of the second bottom-side sealing portion 24B is disposed closer to a lid plate 121 side (an upper end side in FIG. 7) than the first portion 241 of the first bottom-side sealing portion 24A in the Z axis direction. To be more specific, as shown in FIG. 6, FIG. 7 and FIG. 11, the third portion 243 extends in the Y axis direction at a distal end (the distal end in the bulging direction) of the second bulging portion 207 of the bent portion 205 disposed on the other end portion (a lower end portion in FIG. 7) in the Z axis direction of the base 20A.

Figure 11:
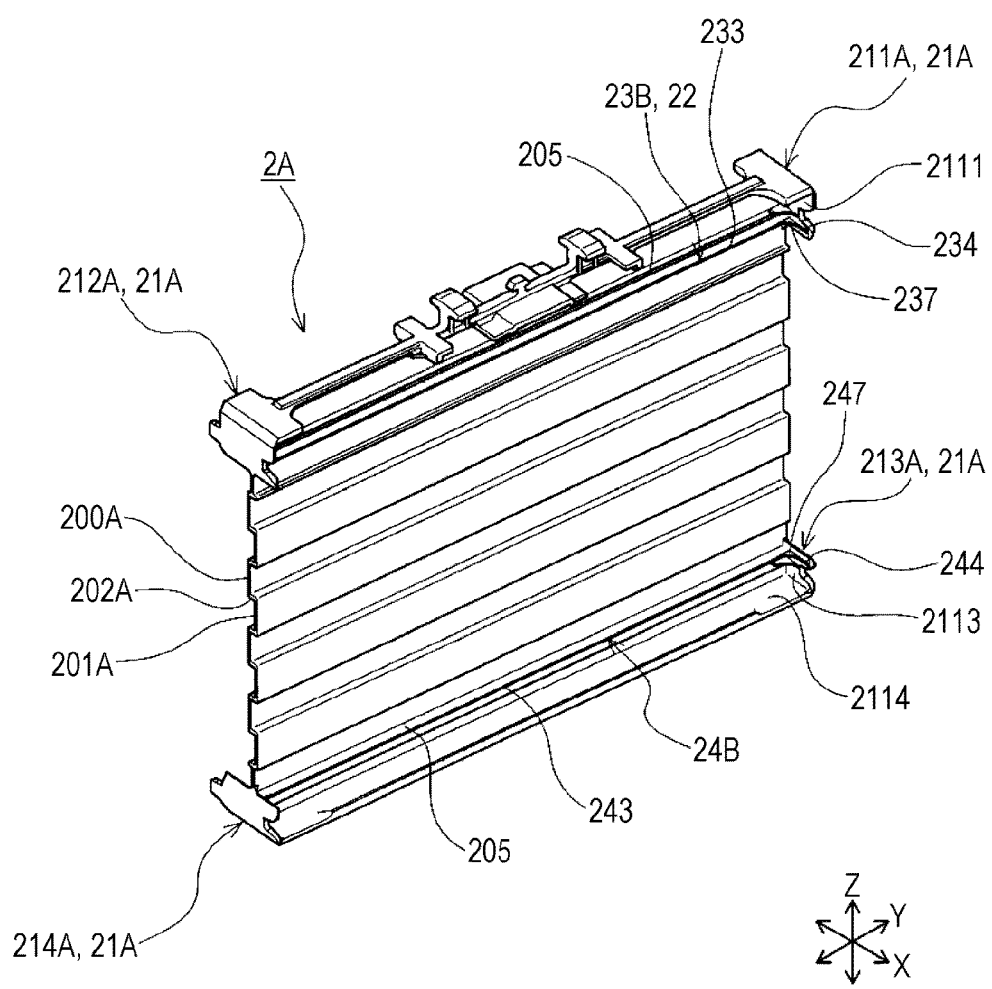
FIG. 11 is a perspective view of the inner spacer as viewed from the second surface side.
Figure 12:
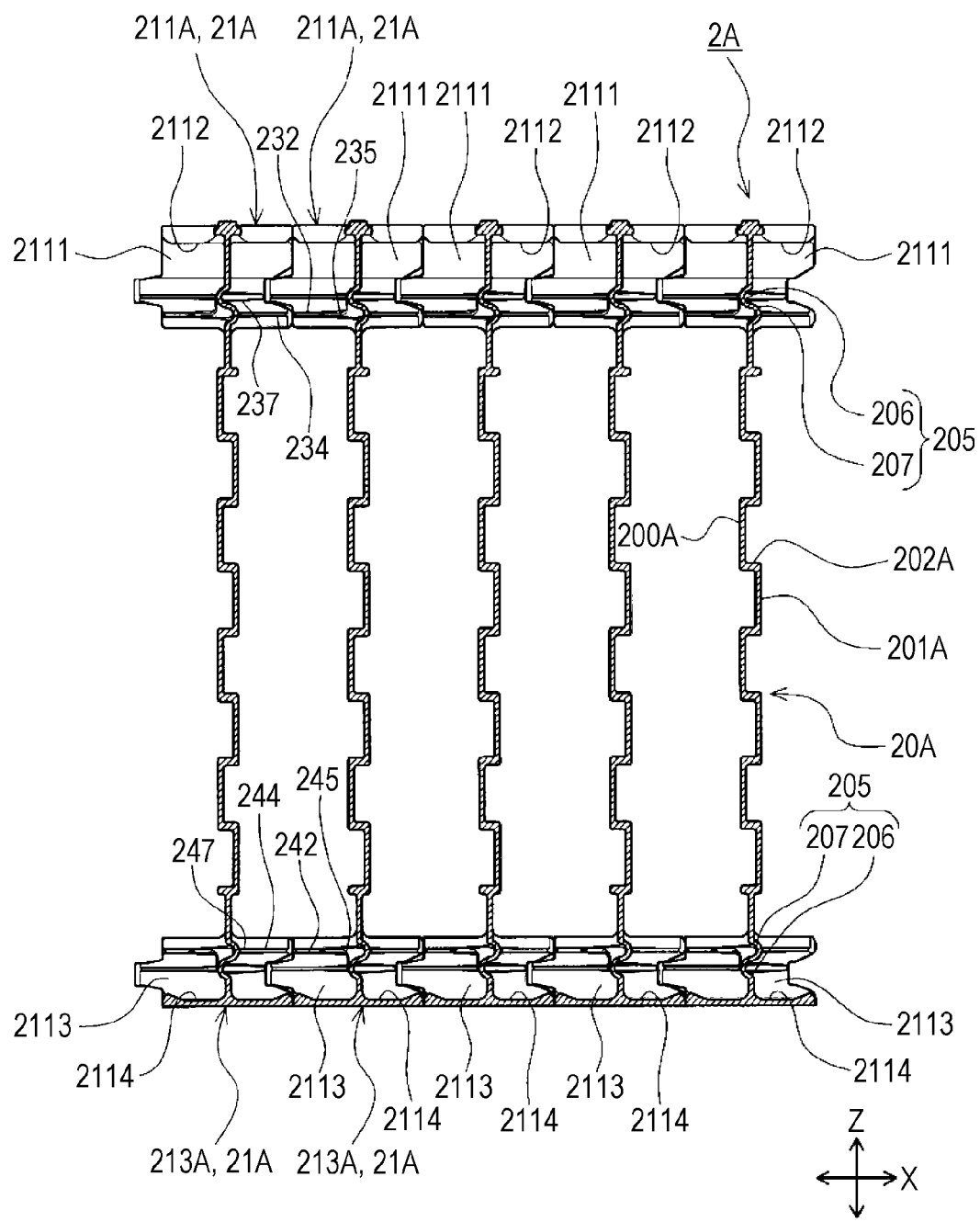
FIG. 12 is a cross-sectional view showing a state where the inner spacers are arranged in a row in an X axis direction.
Figure 16:
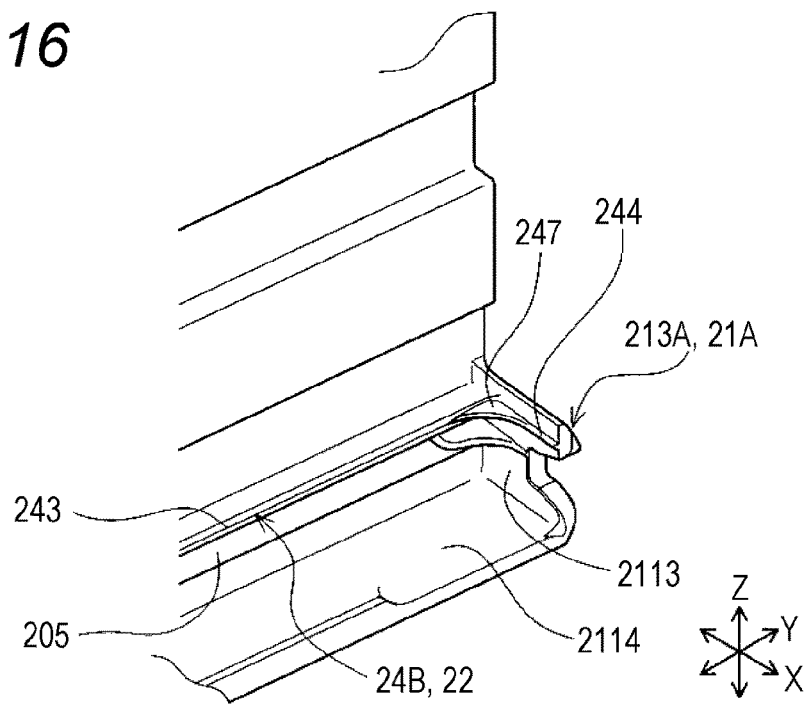
FIG. 16 is an enlarged perspective view of a fourth corner restricting portion of the inner spacer and an area around the fourth corner restricting portion.

As shown in FIG. 7, FIG. 11 and FIG. 16, the fourth portions 244 of the second bottom-side sealing portion 24B are disposed on the third corner restricting portion 213A and the fourth corner restricting portion 214A respectively at the same position as the third portion 243 in the Z axis direction. The fourth portions 244 extend in the X axis direction on the third oppositely facing surfaces 2113 of the third corner restricting portion 213A and the fourth corner restricting portion 214A which oppositely face the second walls 126 of the energy storage device 10.

As shown in FIG. 6, FIG. 7, FIG. 11 and FIG. 16, each second connecting portion 247 of the second bottom-side sealing portion 24B connects the third portion 243 and the fourth portion 244 disposed at the same position in the Z axis direction at a corner portion where the bent portion 205 and the third corner restricting portion 213A or the fourth corner restricting portion 214A are connected to each other. A thickness (a size in the Z axis direction) of the second connecting portion 247 is equal to a thickness of the third portion 243 formed continuously with the second connecting portion 247 and a thickness of the fourth portion 244 formed continuously with the second connecting portion 247. The second connecting portion 247 is deformable. The distal end (end edge) of each second connecting portion 247 is formed into an arcuate shape having a radius of curvature larger than a radius of curvature of the corner portion 127 of the case 12.

The second bottom-side sealing portion 24B (the third portion 243 and the fourth portions 244) having the above-mentioned configuration is disposed at the same position as the second portions 242 of the first bottom-side sealing portion 24A in the Z axis direction. In the inner spacers 2A disposed with the energy storage device 10 interposed therebetween, the third corner restricting portions 213A oppositely face each other, and a distal end of the first bottom-side sealing portion 24A extending to the distal end of the third corner restricting portion 213A and a distal end of the second bottom-side sealing portion 24B extending to the distal end of the third corner restricting portion 213A. Furthermore, in the inner spacers 2A disposed with the energy storage device 10, the fourth corner restricting portions 214A oppositely face each other, and a distal end of the first bottom-side sealing portion 24A extending to the distal end of the fourth corner restricting portion 214A and a distal end of the second bottom-side sealing portion 24B extending to the distal end of the fourth corner restricting portion 214A oppositely face each other (see FIG. 12).

Figure 17:
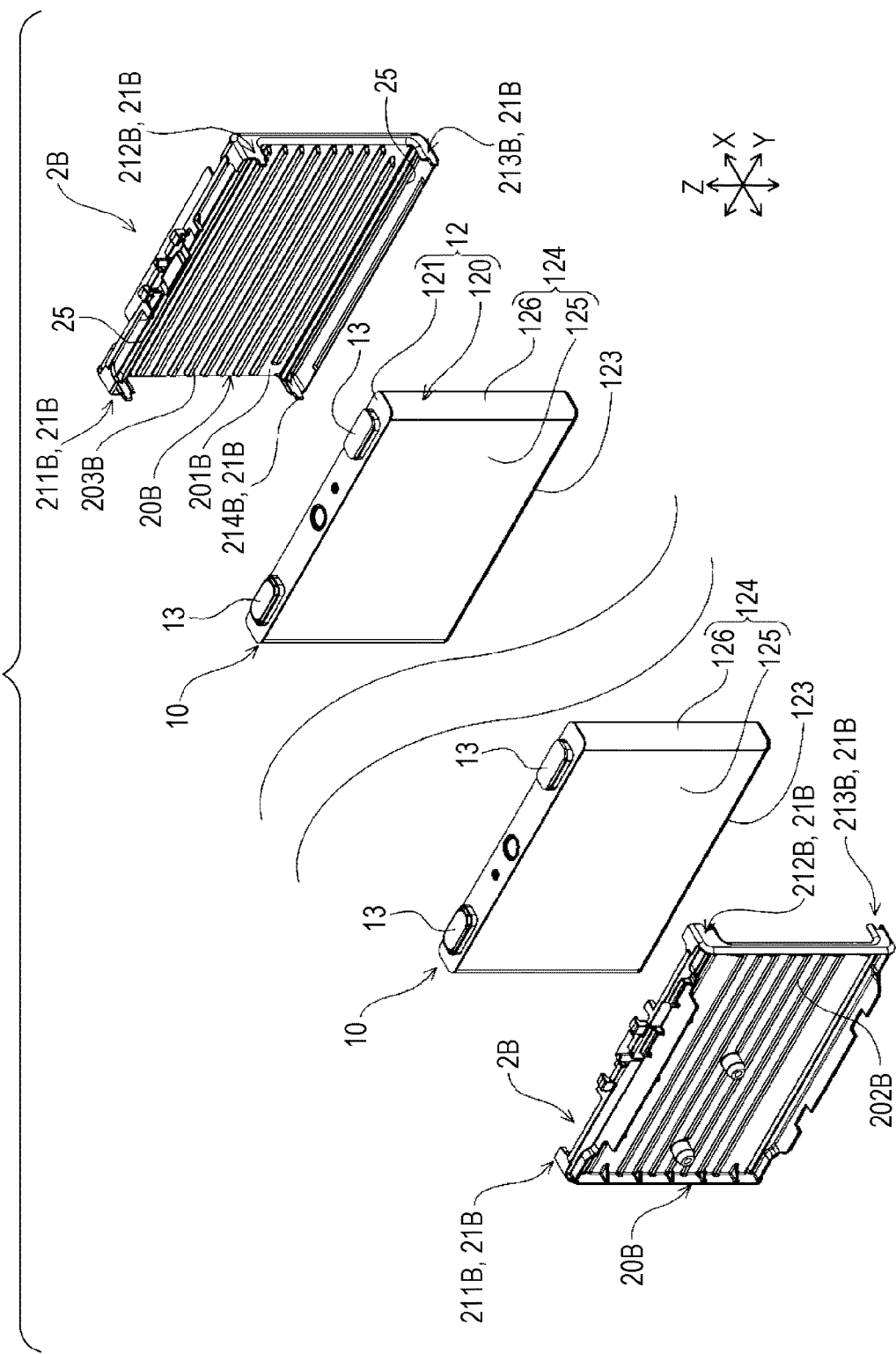
FIG. 17 is an exploded perspective view for describing an outer spacer which the energy storage apparatus includes.

As shown in FIG. 2 and FIG. 17, each of the outer spacers 2B is disposed adjacent to the inner spacer 2A with the energy storage device 10 interposed between the outer spacer 2B and the inner spacer 2A. The energy storage apparatus 1 of this embodiment includes the pair of outer spacers 2B. Each of the pair of outer spacers 2B is disposed adjacently to the outermost energy storage device 10 out of the plurality of energy storage devices 10. That is, the pair of outer spacers 2B is provided so as to sandwich the plurality of energy storage devices 10 arranged in a row in the X axis direction therebetween.

To be more specific, each outer spacer 2B includes a base 20B which expands in the Y-Z plane direction, and restricting portions 21B which restrict the positional displacement of the energy storage device 10 disposed adjacently to the base 20B. In this embodiment, each outer spacer 2B includes sealing portions 25 which project to the energy storage device 10 disposed adjacently to the outer spacer 2B from the base 20B and the restricting portions 21B, and are brought into contact with the energy storage device 10 disposed adjacently to the outer spacer 2B.

In this embodiment, the base 20B of the outer spacer 2B oppositely faces (is disposed adjacently to) a terminal member 30 of the holder 3. That is, each outer spacer 2B is disposed between the energy storage device 10 and the terminal member 30.

The base 20B of the outer spacer 2B includes a plate-like base body 201B which expands in the Y-Z plane direction. The base body 201B has a first surface which opposedly faces the energy storage device 10 (the first wall 125 of the case body 120), and a second surface which is disposed on a side opposite to the first surface. The base 20B includes: outer contact portions 202B which project from the second surface of the base body 201B toward the terminal member 30, and are brought into contact with the terminal member 30; and inner contact portions 203B which project from the first surface of the base body 201B toward the energy storage device 10, and are brought into contact with the energy storage device 10.

The base body 201B has a first end disposed at a position which corresponds to the lid plate 121 of the energy storage device 10, and a second end disposed on a side opposite to the first end at a position which corresponds to the closed portion 123 of the energy storage device 10. The base body 201B also has a third end disposed at a position which corresponds to the second wall 126 of the energy storage device 10 on one side, and a fourth end disposed on a side opposite to the third end at a position which corresponds to the second wall 126 of the energy storage device 10 on the other side.

The base body 201B has a first corner portion where the first end and the third end of the base body 201B are connected to each other, and a second corner portion where the first end and the fourth end of the base body 201B are connected to each other. The base body 201B also has a third corner portion where the second end and the third end of the base body 201B are connected to each other, and a fourth corner portion where the second end and the fourth end of the base body 201B are connected to each other.

The first end and the second end of the base body 201B extend in the Y axis direction respectively. The third end and the fourth end of the base body 201B extend in the Z axis direction respectively. Accordingly, the base body 201B has an approximately rectangular profile as viewed in the X axis direction. The profile of the base body 201B is substantially equal to the profile of the first wall 125 of the energy storage device 10 as viewed in the X axis direction.

With respect to the base 20B, the flow channels which allow a fluid (a fluid for adjusting a temperature of the energy storage devices 10, for example) to pass therethrough are formed between the first surface of the base 20B and the energy storage device 10 disposed adjacently to the first surface.

The description is made more specifically. The inner contact portions 203B are projecting ridges extending in the Y axis direction. In this embodiment, the base 20B includes the plurality of inner contact portions 203B. The plurality of inner contact portions 203B are arranged parallel to each other in the Z axis direction in a spaced-apart manner. With such a configuration, a plurality of flow channels are formed between the base 20B and the energy storage device 10 disposed adjacently with the base 20B. The respective flow channels allow a fluid to flow therethrough in the Y axis direction.

The outer contact portions 202B project from the base body 201B toward the terminal member 30, and are brought into contact with the terminal member 30. Accordingly, a gap is formed between the base body 201B and the terminal member 30.

The restricting portions 21B extend toward the energy storage device 10 disposed adjacently to the first surface of the base 20B. As described previously, the restricting portions 21B prevent the positional displacement of the energy storage device 10 disposed adjacently to the base 20B with respect to the base 20B in the Y-Z plane direction. That is, the restricting portions 21B prevent the relative movement in the Y-Z plane direction between the outer spacer 2B and the energy storage device 10 disposed adjacently to the outer spacer 2B. Hereinafter, the restricting portions 21B extending toward one side (a left side in FIG. 2) in the X axis direction may be referred to as "first restricting portions", and the restricting portions 21B extending toward the other side (a right side in FIG. 2) in the X axis direction may be referred to as "second restricting portions".

The restricting portion 21B is formed at respective corner portions of the base 20B (to be more specific, base body 201B). To be more specific, the outer spacer 2B includes: a first corner restricting portion 211B formed at the first corner portion of the base 20B; a second corner restricting portion 212B formed at the second corner portion of the base 20B; a third corner restricting portion 213B formed at the third corner portion of the base 20B; and a fourth corner restricting portion 214B formed at the fourth corner portion of the base 20B. In this embodiment, the base 20B is connected with the third corner restricting portion 213B and the fourth corner restricting portion 214B at the second end of the base 20B.

With respect to the respective restricting portions 21B (the first to fourth corner restricting portions 211B to 214B) of the outer spacer 2B and the restricting portions 21A (first to fourth corner restricting portions 211A to 214A) of the inner spacer 2A which opposedly face the outer spacer 2B with the energy storage device 10 interposed between the inner spacer 2A and the outer spacer 2B, distal ends of the restricting portions 21B and distal ends of the restricting portions 21A which correspond to the restricting portions 21B opposedly face each other.

The sealing portions 25 extend in the Y axis direction on the first surface of the base 20B, and continuously extend to distal ends of the restricting portions 21B. In this embodiment, the sealing portions 25 are disposed on both end portions of the outer spacer 2B in the Z axis direction. The respective sealing portions 25 are disposed at positions in the Z axis direction which correspond to the sealing portions 22 of the inner spacer 2A which opposedly face the outer spacer 2B with the energy storage device 10 interposed therebetween. To be more specific, end portions of the sealing portion 25 of the outer spacer 2B (distal ends of portions of the sealing portion 25 disposed at the restricting portions 21B) and the end portions of the sealing portion 22 of the inner spacer 2A (distal ends of portions of the sealing portion 22 disposed on the restricting portions 21A) opposedly face each other.

The holder 3 is made of metal. As shown in FIG. 1 and FIG. 2, the holder 3 includes the pair of terminal members 30 which is disposed at positions adjacent to the outer spacers 2B respectively, and frames 31 which connects the pair of terminal members 30 to each other.

The pair of terminal members 30 expand in the Y-Z plane direction respectively. Each of the pair of terminal members 30 includes a pressure contact portion 300 which is brought into contact with the outer contact portions 202B extending from the base 20B of the outer spacer 2B.

The respective frames 31 extend in the X axis direction, and connect the pair of terminal members 30 to each other. In the holder 3 of this embodiment, the frames 31 connect both ends in the Y axis direction of the pair of terminal members 30 to each other. That is, the holder 3 includes a pair of frames 31.

To be more specific, each frame 31 includes: a first connecting portion 310 extending in the X axis direction at a position which corresponds to the lid plates 121 of the energy storage devices 10 in the Z axis direction; and a second connecting portion 311 extending in the X axis direction at a position which corresponds to the closed portions 123 of the energy storage devices 10 in the Z axis direction.

The frame 31 also includes a pair of support portions 312 which extends in the Z axis direction, and connects end portions in the X axis direction of the first connecting portion 310 and the second connecting portion 311 to each other. The frame 31 further includes a reinforcing portion 313 which extends in the Z axis direction, and connects intermediate portions in the X axis direction of the first connecting portion 310 and the second connecting portion 311 to each other.

As described above, the end portions of the first connecting portion 310 and the end portions of the second connecting portion 311 are connected to each other by the pair of support portions 312 so that the frame 31 is formed into a frame shape.

Insulators 4 are made of a material having an insulating property. Each insulator 4 is disposed between the frame 31 and the plurality of energy storage devices 10. To be more specific, each insulator 4 includes: a first insulating portion 41 extending in the X axis direction and disposed between the first connecting portion 310 and the plurality of energy storage devices 10; and a second insulating portion 42 extending in the X axis direction and disposed between the second connecting portion 311 and the plurality of energy storage devices 10. The insulator 4 also includes a pair of third insulating portions 43 which extend in the Z axis direction and is disposed between the support portion 312 and the energy storage device 10. The insulator 4 further includes a fourth insulating portion 44 extending in the Z axis direction and disposed between the reinforcing portion 313 and the energy storage device 10.

Each of the pair of third insulating portions 43 connects an end portions in the X axis direction of the first insulating portion 41 and an end portion of the second insulating portion 42 to each other. The fourth insulating portion 44 connects the first insulating portion 41 and the second insulating portion 42 to each other at a position which corresponds to the reinforcing portion 313 in the X axis direction.

In the energy storage apparatus 1 described above, with respect to one inner spacer 2A and the other inner spacer 2A which are disposed adjacently to the energy storage device 10 in the X axis direction, even when the position in the Z axis direction of the sealing portion 22 (to be more specific, the first portion 231) disposed on the first surface of one inner spacer 2A and the position in the Z axis direction of the sealing portion 22 (to be more specific, the third portions 233) disposed on the second surface of the other inner spacer 2A differ from each other, the sealing portions 22 respectively extend to the distal ends of the pair of restricting portions 21A (to be more specific, the first restricting portions and the second restricting portions) which opposedly face each other at the end portions of the energy storage device 10 in the Y axis direction and, at the same time, the distal ends of the pair of restricting portions 21A opposedly face each other. With such a configuration, at the end portions of the energy storage device 10 in the Y axis direction, a gap is formed between the distal ends of the sealing portion 22 only by an amount equal to a gap formed between the pair of restricting portions 21A (to be more specific, the first restricting portion and the second restricting portion) which opposedly face each other. Accordingly, leakage of a fluid (fluid which flows through a flow channel) from between the sealing portions 22 respectively formed on the pair of restricting portions 21A which opposedly face each other, that is, leakage of a fluid from between the energy storage device 10 and the restricting portions 21A (the first restricting portion and the second restricting portion whose distal ends are made to opposedly face each other) can be suppressed.

In the energy storage apparatus 1 of this embodiment, the first connecting portion 235, 245 continuously changes the position thereof in the Z axis direction toward the second portion 232, 242 from the first portion 231, 241. That is, the first connecting portion 235, 245 smoothly connects the first portion 231, 241 and the second portion 232, 242 disposed at different positions in the Z axis direction. Accordingly, a curved portion is not formed on the sealing portion 23A, 24A and hence, leakage of a fluid from between the energy storage device 10 and the sealing portion 23A, 24A can be preferably suppressed.

In the energy storage apparatus 1 of this embodiment, the first connecting portion 235, 245 is brought into contact with the corner portion 127 of the energy storage device 10 and is deformable. Accordingly, by bringing the first connecting portion 235, 245 into pressure contact with the corner portion 127 of the energy storage device 10, the first connecting portion 235, 245 is deformed and is brought into close contact with the corner portion 127. With such a configuration, leakage of a fluid at the portion (a portion of the energy storage device 10 where the corner portion 127 and the first connecting portion 235, 245 are brought into contact with each other) can be further preferably suppressed.

In the energy storage apparatus 1 of this embodiment, the inner spacer 2A made of a resin is formed as an integral body, the base 20A includes the bent portions 205 each having an S shape (the first bulging portion 206 and the second bulging portion 207) where each bent portion 205 bulges to one side and to the other side in the X axis direction at different positions in the Z axis direction in cross section taken along the X-Z plane, and the first connecting portion 235, 245 is disposed on the corner portion where the bent portion 205 (first bulging portion 206) and the restricting portion 21A are connected to each other. A size of the first connecting portion 235, 245 in the Z axis direction is smaller than a size of the first portion 231, 241 and the second portion 232, 242 in the Z axis direction. With such a configuration, even when the inner spacer 2A is sandwiched between the energy storage devices 10 disposed on both sides of the inner spacer 2A and the bent portion 205 of the spacer is elongated (deformed) in the Z axis direction, the first connecting portion 235, 245 made of a resin and having a small thickness (having a small size in the Z axis direction) is deformed so that a change in relative position in the Z axis direction between the first portion 231, 241 and the second portion 232, 242 can be absorbed. As a result, leakage of a fluid from between the energy storage device 10 and the first connecting portion 235, 245 can be further preferably suppressed.

In the energy storage apparatus 1 of this embodiment, the first portion 231, 241 is disposed at the position closer to the end portion (the first end or the second end) of the base 20A in the Z axis direction than the second portion 232, 242, the third portion 233, 243, and the fourth portion 234, 244. With such a configuration, only the first portion 231, 241 is disposed at the position closer to the end portion (the first end or the second end) of the base 20A in the Z axis direction (that is, the second to fourth portions 232, 242, 233, 243, 234, 244 are disposed at positions away from the end portion of the base 20A in the Z axis direction). Accordingly, even when a size or the like of the energy storage device 10 in the Z axis direction is smaller than a set value due to an error in size or the like, the second to fourth portions 232, 242, 233, 243, 234, 244 are easily brought into contact with the energy storage device 10. With such a configuration, the increase in leakage of a fluid caused by the above-mentioned error in size or the like can be suppressed.

In the energy storage apparatus 1 of this embodiment, the sealing portions 22 forming a pair are disposed on both end portions of the inner spacer 2A in the Z axis direction. With such a configuration, while ensuring a cross-sectional area of the flow channels formed between the energy storage device 10 and the inner spacer 2A, it is possible to prevent more effectively leakage of a fluid which flows through the flow channel in the Y axis direction to the outside from both ends in the Z axis direction.

It is needless to say that the energy storage apparatus of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

Figure 18:
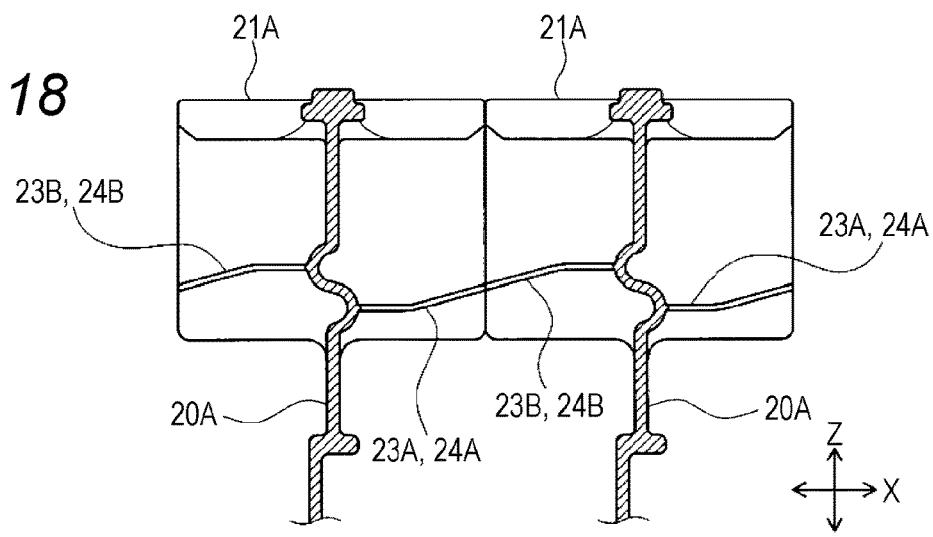
FIG. 18 is a schematic view for describing a sealing portion in another embodiment.
Figure 19:
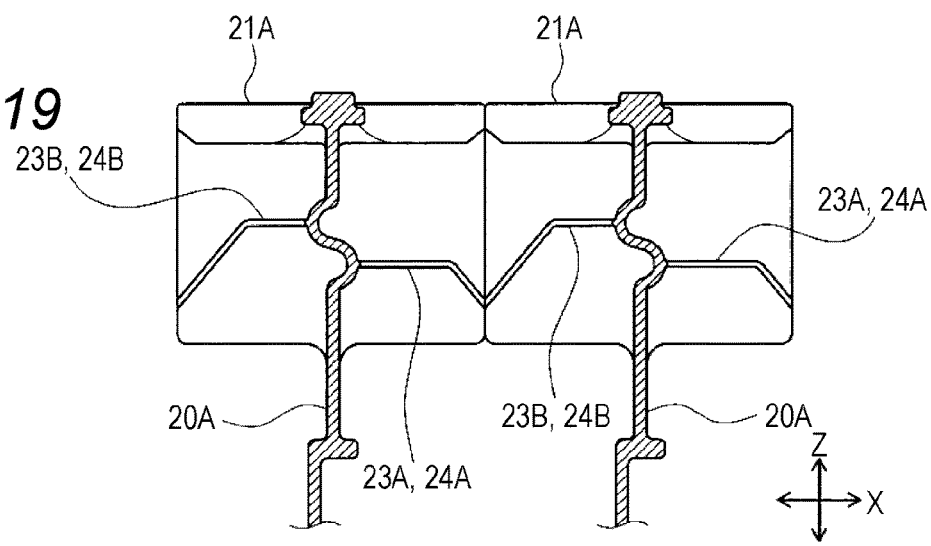
FIG. 19 is a schematic view for describing a sealing portion in another embodiment.
Figure 20:
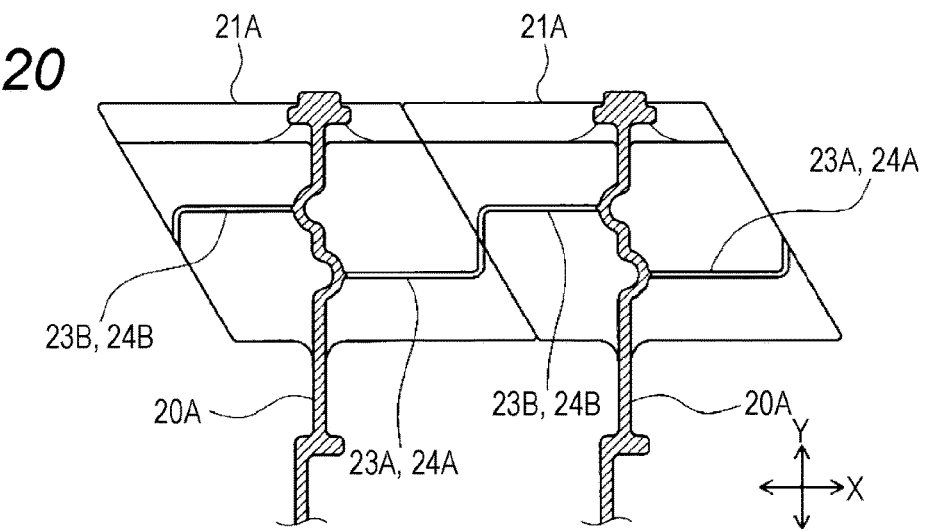
FIG. 20 is a schematic view for describing a sealing portion in another embodiment.
Figure 21:
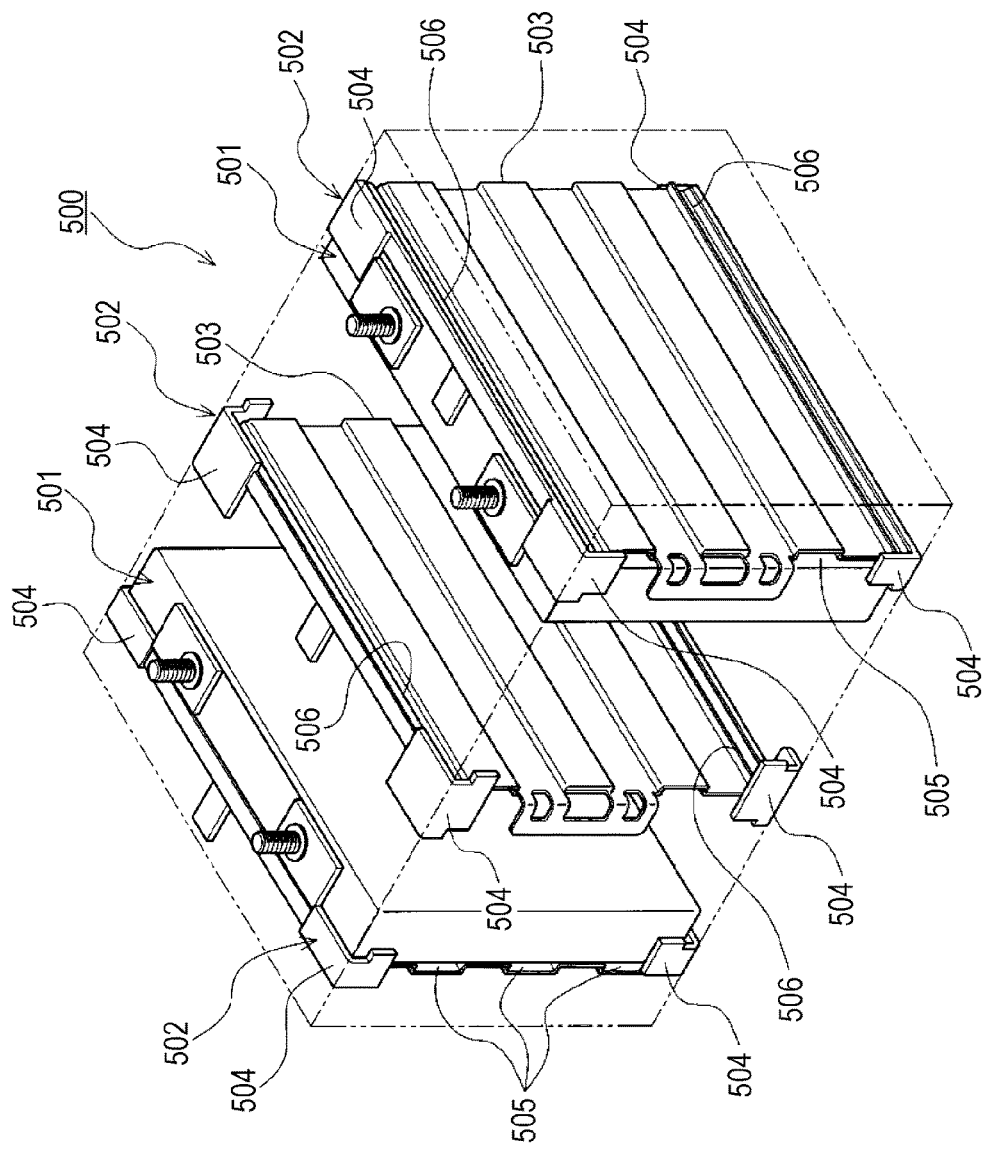
FIG. 21 is an exploded perspective view for describing the configuration of an energy storage apparatus according to a prior art.
Figure 22:
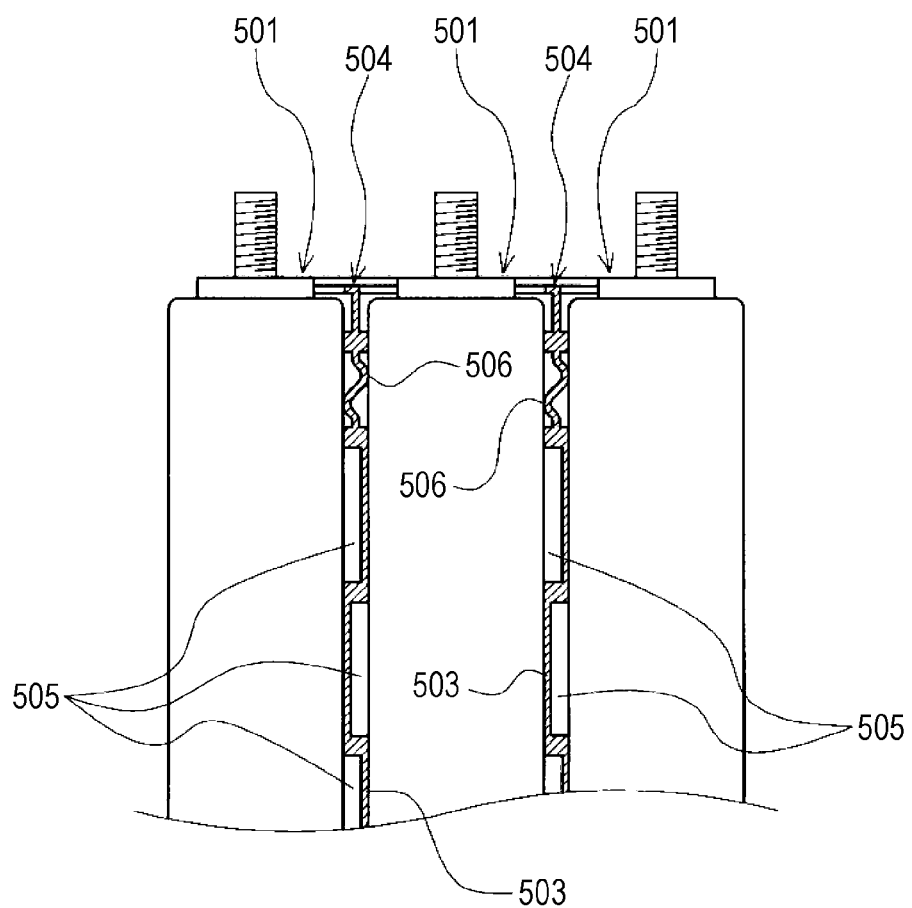
FIG. 22 is a partially enlarged view of the energy storage apparatus.

The specific configurations of the portions of the sealing portion 22 disposed on the restricting portion 21A are not limited. For example, in the above-mentioned energy storage apparatus 1 of the embodiment, the distal end portions of the sealing portions 22 respectively disposed on the pair of oppositely facing restricting portions 21A face each other in a state where the distal end portions extend in the X axis direction. However, for example, as shown in FIG. 18 and FIG. 19, the distal end portions may oppositely face each other in a state where the distal end portions are inclined with respect to the X axis direction or, as shown FIG. 20, the distal end portions may oppositely face each other in a state where the distal end portions extend in the Z axis direction. Further, the sealing portions 22 may have at least portions of the distal ends thereof oppositely face each other.

Although the sealing portions 22 extend in a straight manner on the base 20A, the configuration of the sealing portion 22 is not limited to such a configuration, and the sealing portion 22 may be curved or bent.

With respect to the pair of lid-side sealing portions 23A, 23B of the inner spacer 2A of the above-mentioned embodiment, the first portion 231 of the first lid-side sealing portion 23A is disposed more outside in the Z axis direction than the third portion 233 of the second lid-side sealing portion 23B. However, the lid-side sealing portions 23A, 23B are not limited to such a configuration. The third portion 233 of the second lid-side sealing portion 23B may be arranged more outside in the Z axis direction than the first portion 231 of the first lid-side sealing portion 23A. In the same manner, in the pair of bottom-side sealing portions 24A, 24B, the third portion 243 of the second bottom-side sealing portion 24B may be disposed more outside in the Z axis direction than the first portion 241 of the first bottom-side sealing portion 24A.

In the above-mentioned energy storage apparatus 1 of the embodiment, the pair of sealing portions 22 is disposed at both end portions of the inner spacer 2A in the Z axis direction respectively. However, the pair of sealing portions 22 is not limited to such a configuration. It is sufficient that the pair of sealing portions 22 is disposed at least at one end portion of the inner spacer 2A in the Z axis direction. Further, plural pairs of sealing portions 22 may be disposed at one end portion of the inner spacer 2A in the Z axis direction.

The pair of sealing portions 22 may be disposed at an intermediate portion of the base 20A in the Z axis direction. In this case, the restricting portions 21A are also disposed at an intermediate portion of the base 20A in the Z axis direction (the positions which corresponds to the sealing portions).

In the above-mentioned energy storage apparatus 1 of the embodiment, the respective portions (first to fourth portions) of the sealing portion extend in the X axis direction or in the Y axis direction in a straight manner. However, these portions are not limited to such a configuration. These portions may include portions which are curved or bent.

The specific configuration of the member which includes the sealing portion 22 is not limited. In the above-mentioned energy storage apparatus 1 of the embodiment, with respect to the plurality of respective inner spacers 2A arranged in a row in the X axis direction, the sealing portion (projecting portion) 22 is formed on both surfaces of each inner spacer 2A. However, the sealing portion 22 is not limited to such a configuration. For example, with respect to a pair of spacers which oppositely face each other with the energy storage device 10 interposed therebetween, it is sufficient that the sealing portion 22 is formed on a portion of one (first) spacer 2A, 2B on a surface side which faces the energy storage device 10, and the sealing portion 22 is formed on a portion of the other (second) spacer 2A, 2B on a surface side which faces the energy storage device 10. In this case, for example, the specific configurations are as follows.

One spacer 2A, 2B includes: a first base 20A, 20B which has a first surface expanding in a direction orthogonal to the X axis direction and facing an energy storage device 10, and forms flow channels through which a fluid is allowed to flow between the first base 20A, 20B and the energy storage device 10; restricting portions 21A, 21B (to be more specific, first restricting portions) which extend in the X axis direction from the first base 20A, 20B along an end portion of the energy storage device 10 in the Y axis direction; and a first projecting portion 22 which projects toward the energy storage device 10 from the first surface of the first base 20A, 20B and the first restricting portion and is brought into contact with the energy storage device 10. The first projecting portion 22 includes a first portion 231, 241 extending in the Y axis direction on the first surface of the first base 20A, 20B; and a second portion 232, 242 extending to a distal end of the first restricting portion from a first base 20A, 20B side on the first restricting portion. The first projecting portion 22 is continuously formed at least from an end portion of the first portion 231, 241 on a first restricting portion side to a distal end of the second portion 232, 242.

The other spacer 2A, 2B includes: a second base 20A, 20B which has a second surface expanding in a direction orthogonal to the X axis direction and facing an energy storage device 10, and forms flow channels through which a fluid is allowed to flow between the second base 20A, 20B and the energy storage device 10; restricting portions 21A, 21B (to be more specific, second restricting portions) which extend in the X axis direction from the second base 20A, 20B along an end portion of the energy storage device 10 in the Y axis direction; and a second projecting portion 22 which projects toward the energy storage device 10 from the second surface of the second base 20A, 20B and the second restricting portion and is brought into contact with the energy storage device 10. The second projecting portion 22 includes: a third portion 233, 243 extending in the Y axis direction on the second surface of the second base 20A, 20B and disposed at the position different from the position of the first portion 231, 241 of the first projecting portion 22 in the Z axis direction and; a fourth portion 234, 244 extending to a distal end of the second restricting portion from a second base 20A, 20B side in the second restricting portion. The second projecting portion 22 is continuously formed at least from an end portion of the third portion 233, 243 on a second restricting portion side to a distal end of the fourth portion 234, 244.

The spacers 2A, 2B may be configured such that distal ends of the first restricting portions of one spacer 2A, 2B and distal ends of the second restricting portions of the other spacer 2A, 2B oppositely face each other in the X axis direction, and distal ends of the second portions 232, 242 of one spacer 2A, 2B and distal ends of the fourth portions 234, 244 of the other spacer 2A, 2B oppositely face each other.

In this case, the base 20A, 20B of the spacer 2A, 2B may not be formed into a plate shape which expands in a Y-Z plane direction. That is, the shape of a portion of one spacer 2A, 2B on a side opposite to the energy storage device 10 and the shape of a portion of the other spacer 2A, 2B on a side opposite to the energy storage device 10 are not limited.

The present invention can be carried out in the following forms.

An energy storage apparatus includes: a first spacer and a second spacer arranged in a row in a first direction; and an energy storage device disposed between the first spacer and the second spacer, the first spacer includes: a first base which has a first surface expanding in a direction orthogonal to the first direction and facing the energy storage device, and forms a flow channel through which a fluid is allowed to flow between the first base and the energy storage device; a first restricting portion which extends in the first direction from the first base along an end portion of the energy storage device in a second direction orthogonal to the first direction; and a first projecting portion which projects toward the energy storage device from the first surface of the first base and the first restricting portion, and is brought into contact with the energy storage device, the first projecting portion includes: a first portion extending in the second direction on the first surface of the first base; and a second portion extending to a distal end of the first restricting portion from a first base side on the first restricting portion, the first projecting portion being continuously formed at least from an end portion of the first portion on a first restricting portion side to a distal end of the second portion, the second spacer includes: a second base which has a second surface expanding in a direction orthogonal to the first direction and facing the energy storage device, and forms a flow channel through which a fluid is allowed to flow between the second base and the energy storage device; a second restricting portion which extends in the first direction from the second base along the end portion of the energy storage device in the second direction; and a second projecting portion which projects toward the energy storage device from the second surface of the second base and the second restricting portion, and is brought into contact with the energy storage device, the second projecting portion includes: a third portion extending in the second direction on the second surface of the second base and disposed at a position different from the first portion of the first projecting portion in a third direction orthogonal to the first direction and the second direction; and a fourth portion extending to a distal end of the second restricting portion from a second base side of the second restricting portion, the second projecting portion being continuously formed at least from an end portion of the third portion on a second restricting portion side to a distal end of the fourth portion, the distal end of the first restricting portion of the first spacer and the distal end of the second restricting portion of the second spacer opposedly face each other in the first direction, and the distal end of the second portion of the first spacer and the distal end of the fourth portion of the second spacer opposedly face each other.

The second portion and the fourth portion may respectively extend in the first direction at the same position in the third direction, the third portion may be disposed at the same position as the second portion and the fourth portion in the third direction, the first projecting portion may include a connecting portion which connects the first portion and the second portion to each other, and the connecting portion may be configured to continuously change a position thereof in the third direction as the connecting portion extends toward the second portion from the first portion.

The first base may have a first bulging portion which is a plate-like portion and bulges toward the energy storage device in cross section taken along a plane which includes the first direction and the third direction, the first portion may be disposed on the first bulging portion, the first base, the first restricting portion and the first projecting portion may be formed as an integral body made of a resin, the connecting portion may be disposed on a corner portion where the first bulging portion and the first restricting portion are connected to each other, and a size of the connecting portion in the third direction may be smaller than a size of the first portion in the third direction.

The first portion may be disposed at a position closer to an end portion of the first base than the second portion, the third portion and the fourth portion in the third direction.

The connecting portion may be brought into contact with a corner portion of the energy storage device and be deformable.

The flow channel may allow the fluid to flow therethrough in the second direction, the first projecting portion may be disposed on both end portions in the third direction on the first surface of the first base, and the second projecting portion may be disposed on both end portions in the third direction of the second surface of the second base.

The energy storage device may include a case having a prismatic cylindrical peripheral surface where corner portions are curved, and an edge of the connecting portion in a projecting direction may be formed into an arcuate shape having a larger radius of curvature than the corner portions of the case.

The energy storage device may include a case having a prismatic cylindrical peripheral surface where a flat surface and a corner portion may be alternately connected to each other, and the connecting portion may be continuously brought into contact with the peripheral surface from one flat surface to another flat surface which is disposed adjacently to one flat surface by way of the corner portion.

A spacer includes: a base having a first surface which is directed toward one side in a first direction and a second surface which is directed toward the other side in the first direction, the first surface and the second surface expanding in a direction orthogonal to the first direction; a first restricting portion extending toward one side in the first direction from an end portion of the base in a second direction orthogonal to the first direction; a second restricting portion extending toward the other side in the first direction from the end portion of the base at the same position as the first restricting portion in a third direction orthogonal to the first direction and the second direction; a first projecting portion which projects from the first surface of the base and the first restricting portion; and a second projecting portion which projects from the second surface of the base and the second restricting portion, the first projecting portion includes: a first portion extending in the second direction on the first surface; and a second portion extending to a distal end of the first restricting portion from a base side on the first restricting portion, the first projecting portion being continuously formed at least from an end portion of the first portion on a first restricting portion side to a distal end of the second portion, the second projecting portion includes: a third portion extending in the second direction on the second surface and disposed at a position different from the first portion of the first projecting portion in the third direction; and a fourth portion extending to a distal end of the second restricting portion from a base side on the second restricting portion, the second projecting portion being continuously formed at least from an end portion of the third portion on a second restricting portion side to a distal end of the fourth portion, and the distal end of the second portion and the distal end of the fourth portion are disposed at the same position in the third direction.

The base may include: a first bulging portion which is a plate-like portion and bulges toward one side in the first direction in cross section taken along a plane which includes the first direction and the third direction; and a second bulging portion which is a plate-like portion and bulges toward the other side in the first direction in cross section taken along a plane which includes the first direction and the third direction, the first bulging portion and the second bulging portion may be disposed on the base at different positions in the third direction, the first portion may be formed on the first bulging portion, the third portion may be formed on the second bulging portion, the base, the first restricting portion, the second restricting portion, the first projecting portion and the second projecting portion may be formed as an integral body made of a resin, the first projecting portion may include a connecting portion which connects the first portion and the second portion to each other, and be disposed at a corner portion where the first bulging portion and the first restricting portion may be connected to each other, and a size of the connecting portion in the third direction may be smaller than a size of the first portion in the third direction.

The first bulging portion and the second bulging portion may be connected to each other in the third direction.

An energy storage apparatus may include a plurality of energy storage devices; and a plurality of spacers described in the above-mentioned, the energy storage device and the spacer may be alternately arranged in the first direction.

What is claimed is:

1. An energy storage apparatus comprising:
a first spacer and a second spacer arranged in a row in a first direction; and
an energy storage device disposed between the first spacer and the second spacer,
wherein the first spacer includes:
a first base which has a first surface expanding in a direction orthogonal to the first direction and facing the energy storage device, and forms a flow channel through which a fluid is allowed to flow between the first base and the energy storage device;
a first restricting portion which extends in the first direction from the first base along an end portion of the energy storage device in a second direction orthogonal to the first direction; and
a first projecting portion which projects toward the energy storage device from the first surface of the first base and the first restricting portion, and is brought into contact with the energy storage device,
wherein the first projecting portion includes: a first portion extending in the second direction on the first surface of the first base; and a second portion extending to a distal end of the first restricting portion from a first base side on the first restricting portion, the first projecting portion being continuously formed at least from an end portion of the first portion on a first restricting portion side to a distal end of the second portion,
the second spacer includes:
a second base which has a second surface expanding in a direction orthogonal to the first direction and facing the energy storage device, and forms a flow channel through which a fluid is allowed to flow between the second base and the energy storage device;
a second restricting portion which extends in the first direction from the second base along the end portion of the energy storage device in the second direction; and
a second projecting portion which projects toward the energy storage device from the second surface of the second base and the second restricting portion, and is brought into contact with the energy storage device,
wherein the second projecting portion includes: a third portion extending in the second direction on the second surface of the second base and disposed at a position different from the first portion of the first projecting portion in a third direction orthogonal to the first direction and the second direction; and a fourth portion extending to a distal end of the second restricting portion from a second base side of the second restricting portion, the second projecting portion being continuously formed at least from an end portion of the third portion on a second restricting portion side to a distal end of the fourth portion,
the distal end of the first restricting portion of the first spacer and the distal end of the second restricting portion of the second spacer opposedly face each other in the first direction, and
the distal end of the second portion of the first spacer and the distal end of the fourth portion of the second spacer opposedly face each other.

2. The energy storage apparatus according to claim 1, wherein the second portion and the fourth portion respectively extend in the first direction at the same position in the third direction,
the third portion is disposed at the same position as the second portion and the fourth portion in the third direction,
the first projecting portion includes a connecting portion which connects the first portion and the second portion to each other, and
the connecting portion is configured to continuously change a position thereof in the third direction as the connecting portion extends toward the second portion from the first portion.

3. The energy storage apparatus according to claim 2, wherein the first base has a first bulging portion which is a plate-like portion and bulges toward the energy storage device in cross section taken along a plane which includes the first direction and the third direction, the first portion is disposed on the first bulging portion, the first base, the first restricting portion and the first projecting portion are formed as an integral body made of a resin, the connecting portion is disposed on a corner portion where the first bulging portion and the first restricting portion are connected to each other, and a size of the connecting portion in the third direction is smaller than a size of the first portion in the third direction.

4. The energy storage apparatus according to claim 2, wherein the first portion is disposed at a position closer to an end portion of the first base than the second portion, the third portion and the fourth portion in the third direction.

5. The energy storage apparatus according to claim 2, wherein the connecting portion is brought into contact with a corner portion of the energy storage device and is deformable.

6. The energy storage apparatus according to claim 1, wherein the flow channel allows the fluid to flow therethrough in the second direction, the first projecting portion is disposed on both end portions in the third direction on the first surface of the first base, and the second projecting portion is disposed on both end portions in the third direction of the second surface of the second base.

7. The energy storage apparatus according to claim 2, wherein the energy storage device includes a case having a prismatic cylindrical peripheral surface where corner portions are curved, and an edge of the connecting portion in a projecting direction is formed into an arcuate shape having a larger radius of curvature than the corner portions of the case.

8. The energy storage apparatus according to claim 2, wherein the energy storage device includes a case having a prismatic cylindrical peripheral surface where a flat surface and a corner portion are alternately connected to each other, and the connecting portion is continuously brought into contact with the peripheral surface from one flat surface to another flat surface which is disposed adjacently to one flat surface by way of the corner portion.

9. A spacer comprising:

a base having a first surface which is directed toward one side in a first direction and a second surface which is directed toward the other side in the first direction, the first surface and the second surface expanding in a direction orthogonal to the first direction;

a first restricting portion extending toward one side in the first direction from an end portion of the base in a second direction orthogonal to the first direction;

a second restricting portion extending toward the other side in the first direction from the end portion of the base at the same position as the first restricting portion in a third direction orthogonal to the first direction and the second direction;

a first projecting portion which projects from the first surface of the base and the first restricting portion; and a second projecting portion which projects from the second surface of the base and the second restricting portion, wherein the first projecting portion includes: a first portion extending in the second direction on the first surface; and a second portion extending to a distal end of the first restricting portion from a base side on the first restricting portion, the first projecting portion being continuously formed at least from an end portion of the first portion on a first restricting portion side to a distal end of the second portion, the second projecting portion includes: a third portion extending in the second direction on the second surface and disposed at a position different from the first portion of the first projecting portion in the third direction; and a fourth portion extending to a distal end of the second restricting portion from a base side on the second restricting portion, the second projecting portion being continuously formed at least from an end portion of the third portion on a second restricting portion side to a distal end of the fourth portion, and the distal end of the second portion and the distal end of the fourth portion are disposed at the same position in the third direction.

10. The spacer according to claim 9, wherein the base includes:

a first bulging portion which is a plate-like portion and bulges toward one side in the first direction in cross section taken along a plane which includes the first direction and the third direction; and a second bulging portion which is a plate-like portion and bulges toward the other side in the first direction in cross section taken along a plane which includes the first direction and the third direction, the first bulging portion and the second bulging portion are disposed on the base at different positions in the third direction, the first portion is formed on the first bulging portion, the third portion is formed on the second bulging portion, the base, the first restricting portion, the second restricting portion, the first projecting portion and the second projecting portion are formed as an integral body made of a resin, the first projecting portion includes a connecting portion which connects the first portion and the second portion to each other, and is disposed at a corner portion where the first bulging portion and the first restricting portion are connected to each other, and a size of the connecting portion in the third direction is smaller than a size of the first portion in the third direction.

11. The spacer according to claim 10, wherein the first bulging portion and the second bulging portion are connected to each other in the third direction.

12. An energy storage apparatus including:

a plurality of energy storage devices; and a plurality of spacers according to claim 10, wherein the energy storage device and the spacer are alternately arranged in the first direction.

* * * * *